(12) United States Patent
Yonaha

(10) Patent No.: US 11,948,291 B2
(45) Date of Patent: *Apr. 2, 2024

(54) DAMAGE DIAGRAM CREATION METHOD, DAMAGE DIAGRAM CREATION DEVICE, DAMAGE DIAGRAM CREATION SYSTEM, AND RECORDING MEDIUM

(71) Applicant: FUJIFILM Corporation, Tokyo (JP)

(72) Inventor: Makoto Yonaha, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/050,792

(22) Filed: Oct. 28, 2022

(65) Prior Publication Data

US 2023/0080316 A1 Mar. 16, 2023

Related U.S. Application Data

(63) Continuation of application No. 16/748,921, filed on Jan. 22, 2020, now Pat. No. 11,523,013, which is a (Continued)

(30) Foreign Application Priority Data

Jul. 25, 2017 (JP) ................................ 2017-143756

(51) Int. Cl.
*G06T 7/33* (2017.01)
*G06T 5/50* (2006.01)
(Continued)

(52) U.S. Cl.
CPC .............. *G06T 7/0008* (2013.01); *G06T 5/50* (2013.01); *G06T 7/0004* (2013.01); *G06T 7/33* (2017.01);
(Continued)

(58) Field of Classification Search
CPC ..... G06T 7/30–38; G06T 7/0002–0016; G06T 5/50
See application file for complete search history.

(56) References Cited

U.S. PATENT DOCUMENTS 10,192,301 B1 * 1/2019 Panda .................... G06T 7/0008
11,094,120 B2 * 8/2021 Ikeda ...................... G06T 19/20
(Continued)

FOREIGN PATENT DOCUMENTS

JP H05-322778 A 12/1993
JP H11-132961 A 5/1999
(Continued)

OTHER PUBLICATIONS

An Office Action mailed by China National Intellectual Property Administration dated Mar. 8, 2023, which corresponds to Chinese Patent Application No. 201880049642.7 and is related to U.S. Appl. No. 18/050,792; with English language translation.

(Continued)

*Primary Examiner* — Sean T Motsinger
(74) *Attorney, Agent, or Firm* — Studebaker & Brackett PC

(57) ABSTRACT

Provided are a damage diagram creation method, a damage diagram creation device, a damage diagram creation system, and a recording medium capable of detecting damage with high accuracy based on a plurality of images acquired by subjecting a subject to split imaging.
In a damage diagram creation method, damage of a subject is detected from each image (each image in a state of being not composed) constituting a plurality of images (a plurality of images acquired by subjecting the subject to split imaging), and thus, damage detection performance is not deteriorated due to deterioration of image quality in an overlapping area. Therefore, it is possible to detect damage with high accuracy based on a plurality of images acquired by (Continued)

subjecting the subject to split imaging. Detection results for the respective images can be composed using a composition parameter calculated based on correspondence points between the images.

17 Claims, 26 Drawing Sheets

Related U.S. Application Data continuation of application No. PCT/JP2018/024406, filed on Jun. 27, 2018.

(51) Int. Cl.
  *G06T 7/00* (2017.01)
  *H04N 1/00* (2006.01)
  *H04N 101/00* (2006.01)

(52) U.S. Cl.
  CPC ..... *H04N 1/00453* (2013.01); *H04N 1/00458* (2013.01); *H04N 1/00461* (2013.01); *H04N 2101/00* (2013.01); *H04N 2201/325* (2013.01)

(56) References Cited

U.S. PATENT DOCUMENTS

| | | | | |
|---|---|---|---|---|
| 11,523,013 | B2* | 12/2022 | Yonaha | G06T 7/0008 |
| 2003/0095193 | A1* | 5/2003 | May | H04N 23/698 |
| | | | | 348/E5.053 |
| 2005/0237566 | A1* | 10/2005 | Sakuda | H04N 1/00347 |
| | | | | 358/1.15 |
| 2007/0031062 | A1* | 2/2007 | Pal | H04N 23/698 |
| | | | | 382/284 |
| 2007/0121146 | A1* | 5/2007 | Nesbit | H04L 51/58 |
| | | | | 358/1.15 |
| 2008/0195330 | A1* | 8/2008 | Hara | G01N 29/043 |
| | | | | 702/40 |
| 2010/0067780 | A1* | 3/2010 | Kawaragi | G01N 21/95607 |
| | | | | 382/218 |
| 2011/0150326 | A1 | 6/2011 | Jeong et al. | |
| 2011/0169985 | A1* | 7/2011 | Cooper | G06T 3/4038 |
| | | | | 348/241 |
| 2011/0170762 | A1* | 7/2011 | Floeder | G06T 7/0006 |
| | | | | 382/141 |
| 2014/0270475 | A1* | 9/2014 | Huang | G06T 7/001 |
| | | | | 382/149 |
| 2014/0365432 | A1* | 12/2014 | Jain | G06F 16/13 |
| | | | | 707/610 |
| 2015/0221116 | A1* | 8/2015 | Wu | A61B 1/000094 |
| | | | | 382/128 |
| 2015/0287160 | A1* | 10/2015 | Nagato | G06F 18/22 |
| | | | | 382/307 |
| 2016/0342848 | A1 | 11/2016 | Seki et al. | |
| 2017/0038307 | A1* | 2/2017 | Ohta | G01N 21/88 |
| 2017/0358068 | A1* | 12/2017 | Strebel | G01S 13/90 |
| 2018/0195973 | A1* | 7/2018 | Yonekawa | G01B 11/30 |
| 2018/0232875 | A1* | 8/2018 | Kanodia | G06T 7/0004 |
| 2018/0292328 | A1* | 10/2018 | Karube | G01N 21/8851 |
| 2018/0292329 | A1* | 10/2018 | Karube | G01N 21/8851 |
| 2018/0293664 | A1* | 10/2018 | Zhang | G06V 10/454 |
| 2018/0308230 | A1* | 10/2018 | Karube | G06N 3/08 |
| 2019/0180474 | A1* | 6/2019 | Li | G06T 7/337 |
| 2020/0111203 | A1* | 4/2020 | Tan | G06V 10/806 |
| 2020/0118247 | A1* | 4/2020 | Yonaha | G06T 3/4038 |
| 2020/0162626 | A1* | 5/2020 | Yonaha | G01N 21/88 |
| 2020/0175663 | A1* | 6/2020 | Horita | H04N 23/60 |
| 2020/0175666 | A1* | 6/2020 | Ohshima | G01C 11/04 |
| 2020/0293830 | A1* | 9/2020 | Liu | G06N 3/08 |
| 2020/0311867 | A1* | 10/2020 | Nitto | G06T 3/40 |
| 2020/0357111 | A1* | 11/2020 | Wang | G06T 7/0002 |
| 2021/0272272 | A1* | 9/2021 | Matsumoto | G06T 7/50 |

FOREIGN PATENT DOCUMENTS

| | | |
|---|---|---|
| JP | 2002-131033 A | 5/2002 |
| JP | 2006-162583 A | 6/2006 |
| JP | 2010-538258 A | 12/2010 |
| JP | 2012-114678 A | 6/2012 |
| JP | 2016-024516 A | 2/2016 |
| JP | 2016-218762 A | 12/2016 |
| WO | 2017/051633 A1 | 3/2017 |

OTHER PUBLICATIONS

Wang et al. "Coregistration between SAR image subsets using pointwise targets"; Proc. 'Fringe 2011 Workshop; Sep. 19-23, 2011 (Year: 2011).

Prasanna et al.; "Automated Crack Detection on Concretet bridges" IEEE transactions on Automation Science and Engineering, vol. 13, No. 2, Apr. 2016 (Year: 2016).

Hung M LA; "Automated Robotic Monitoring and Inspection of Steel Structures and Bridges"; arxiv. org; Cornell University Library; May 2017; XP080947794; Ithaca, NY.

Mohammad R. Jahanshahi et al.; "Multi-image stitching and scene reconstruction for evaluating defect evolution in structures"; SHM. Structural Health Monitoring; vol. 10; No. 6; Nov. 1, 2011; pp. 643-657; XP055706859.

Christian Koch et al.; "A review on computer vision based defect detection and condition assessment of concrete and asphalt civil infrastructure"; Advance Engineering Informatics; Feb. 21, 2015; pp. 196-210; vol. 29; No. 2; XP029585838; Elsevier; Amsterdam, NL.

R.S. Adhikari et al.; "Image-based retrieval of concrete crack properties for bridge inspection"; Automation in Construction; Apr. 1, 2014; pp. 180-194; vol. 39; XP055308376; Elsevier, Amsterdam, NL.

Muhammad Aliakbar et al.; "Progressive image stitching algorithm for vision based automated inspection"; 2016 International Conference on Machine Learning and Cybernetics (ICMLC); Jul. 1, 2016; pp. 337-343; XP055706937; IEEE.

The extended European search report issued by the European Patent Office dated Jul. 6, 2020, which corresponds to European Patent Application No. 18838365.7-1210 and is related to U.S. Appl. No. 16/748,921.

An Office Action; "Notice of Reasons for Refusal," mailed by the Japanese Patent Office dated Sep. 1, 2020, which corresponds to Japanese Patent Application No. 2019-532456 and is related to U.S. Appl. No. 16/748,921; with English language translation.

International Search Report issued in PCT/JP2018/024406; dated Oct. 2, 2018.

International Preliminary Report on Patentability issued in PCT/JP2018/024406; completed May 17, 2019.

Communication pursuant to Article 94(3) EPC issued by the European Patent Office dated Feb. 7, 2023, which corresponds to European Patent Application No. 18838365.7-1210 and is related to U.S. Appl. No. 18/050,792.

Jahanshahi Mohammad Reza; "Vision-based studies for structural health monitoring and condition assessment", UMI Dissertation Publishing, Jan. 1, 2011, total 205 pages, XP093019501, ISBN: 978-1-124-95041-9.

\* cited by examiner

FIG. 16
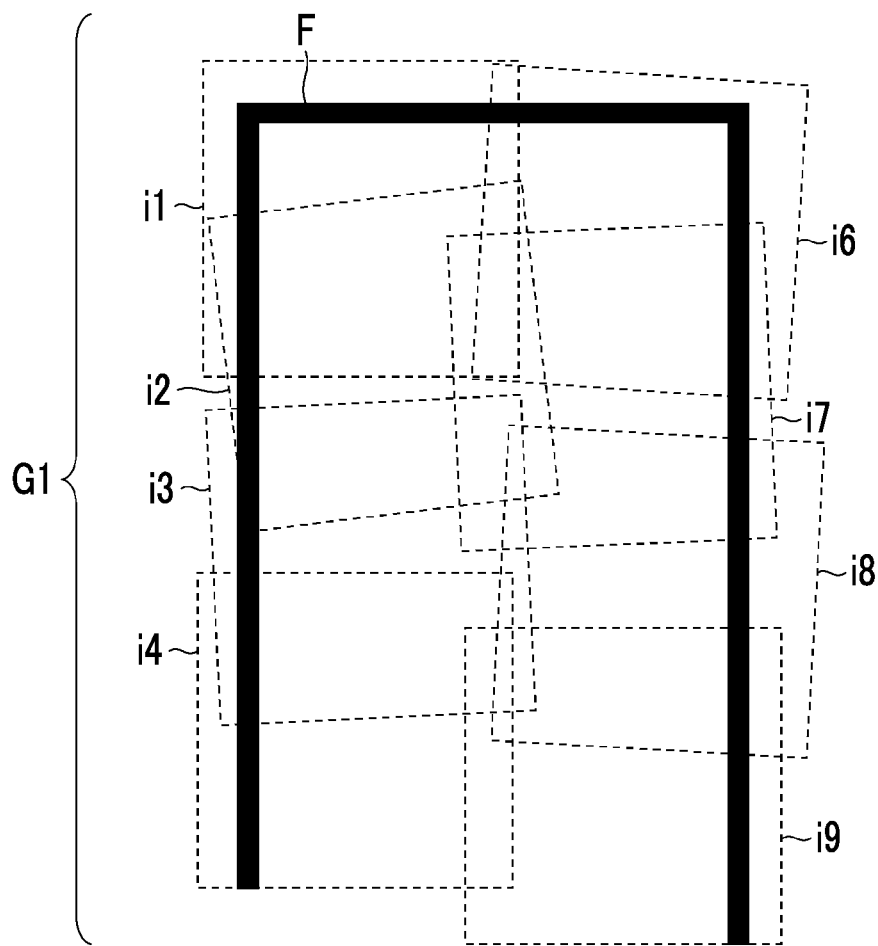
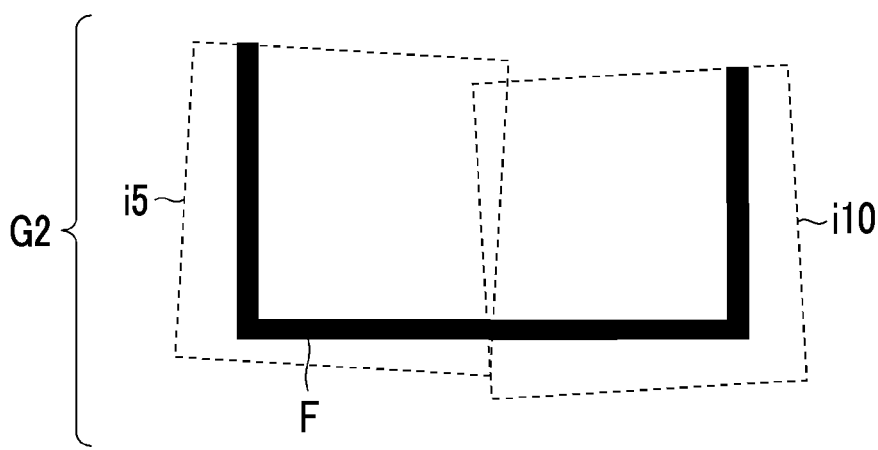

FIG. 18
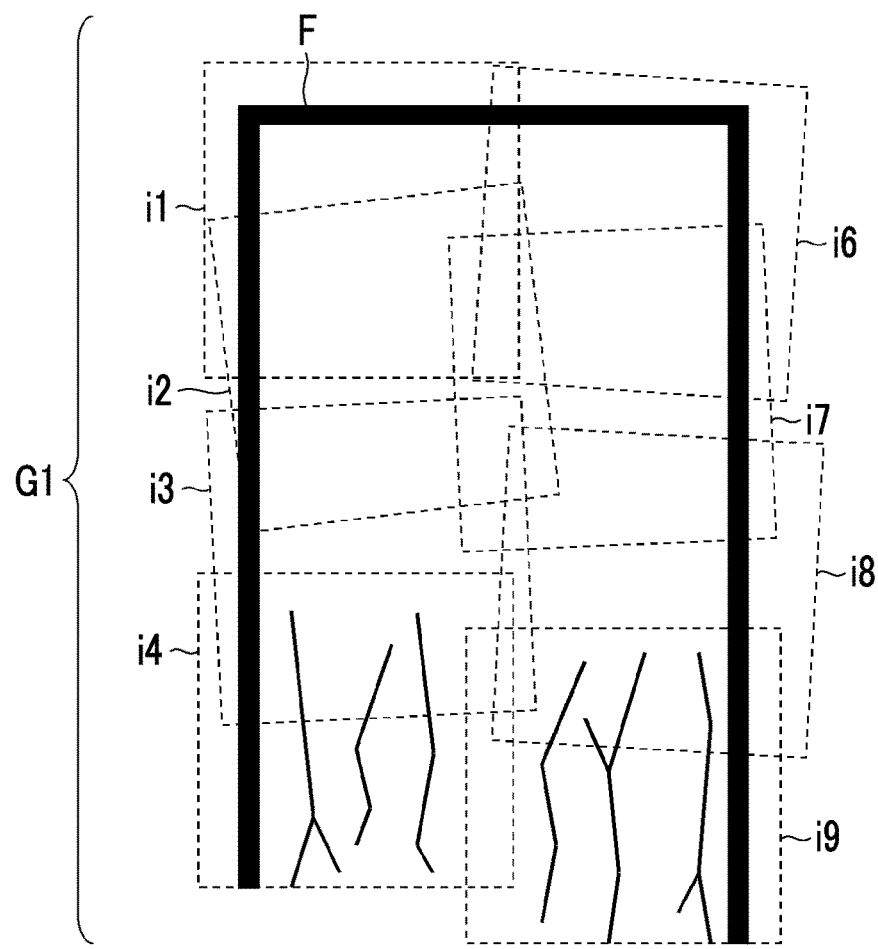
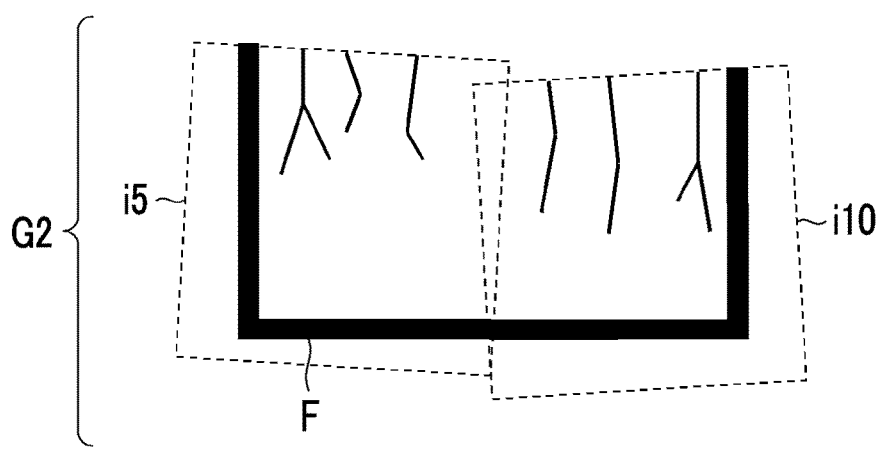
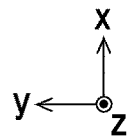

FIG. 22A

| DAMAGE VECTOR | START POINT | END POINT |
|---|---|---|
| V1 | P7(x,y) | P8(x,y) |
| V2 | P8(x,y) | P9(x,y) |

FIG. 22B

| DAMAGE VECTOR | START POINT | END POINT |
|---|---|---|
| V1 | P10(x,y) | P11(x,y) |
| V2 | P11(x,y) | P12(x,y) |

FIG. 22C

| DAMAGE VECTOR | START POINT | END POINT |
|---|---|---|
| V1 | P7(x,y) | P8(x,y) |
| V2 | P8(x,y) | P12(x,y) |

DAMAGE DIAGRAM CREATION METHOD, DAMAGE DIAGRAM CREATION DEVICE, DAMAGE DIAGRAM CREATION SYSTEM, AND RECORDING MEDIUM

CROSS-REFERENCE TO RELATED APPLICATIONS

The present application is a Continuation of U.S. patent application Ser. No. 16/748,921 filed on Jan. 22, 2020, which is a Continuation of PCT International Application No. PCT/JP2018/024406 filed on Jun. 27, 2018, claiming priority under 35 U.S.C § 119(a) to Japanese Patent Application No. 2017-143756 filed on Jul. 25, 2017. Each of the above applications is hereby expressly incorporated by reference, in its entirety, into the present application.

BACKGROUND OF THE INVENTION

1. Field of the Invention

The present invention relates to a damage diagram creation method, a damage diagram creation device, a damage diagram creation system, and a recording medium, and in particular, to a technique for detecting damage based on a plurality of images acquired by subjecting a subject to split imaging.

2. Description of the Related Art

In a case where an image of a subject is captured, the subject may not be captured within one image under conditions of the type, size, and the like of the subject and may be subjected to split imaging into a plurality of images. In this case, a plurality of captured images are composed into one image through image processing and are used for purposes, such as admiration and measurement. For example, JP2016-218762A describes that captured images acquired during traveling on a road are transformed and composed to generate an inspection area image and a defective point, such as a crack, is detected from the inspection area image.

SUMMARY OF THE INVENTION

In a case where detection and measurement of damage of the subject are performed using an image obtained through composition processing described above, misregistration of images may occur in a portion (overlapping area) where images overlap each other. In a case where the images are weighted and composed in the overlapping area, damage may be blurred. In a case where the images are deteriorated in the overlapping area in this way, detection accuracy of damage may be deteriorated, for example, slight damage may not be detected from a composite image, and a damage diagram with high accuracy may not be created. However, in JP2016-218762A described above, deterioration of the damage detection performance due to deterioration of image quality in the overlapping area has not been taken into consideration.

In this way, in the related art, it is not possible to detect damage based on a plurality of images acquired by subjecting a subject to split imaging with high accuracy.

The invention has been accomplished in consideration of such a situation, and an object of the invention is to provide a damage diagram creation method, a damage diagram creation device, a damage diagram creation system, and a recording medium capable of detecting damage with high accuracy based on a plurality of images acquired by subjecting a subject to split imaging.

In order to achieve the above-described object, a first aspect of the invention provides a damage diagram creation method comprising a step of receiving a plurality of images acquired by split-imaging a subject, a step of calculating a composition parameter for composing the plurality of images based on correspondence points between images, a step of detecting damage of the subject from each image constituting the plurality of images, and a step of composing results of the detection for the plurality of images based on the composition parameter.

In the damage diagram creation method according to the first aspect, since damage of the subject is detected from each image (an image in a state of being not composed) constituting a plurality of images (a plurality of images acquired by subjecting a subject to split imaging), damage detection performance is not deteriorated due to deterioration of image quality in an overlapping area. Therefore, it is possible to detect damage based on a plurality of images acquired by subjecting a subject to split imaging with high accuracy. The results of the detection for the respective images can be composed using the composition parameter calculated based on the correspondence points between the images. In the first aspect and the following aspects, "the results of the detection" may be denoted as "detection results".

In the first aspect, any of the step of calculating the composition parameter and the step of detecting damage from the image may be executed earlier or these steps may be executed in parallel. Since the damage diagram can be created in a case where the composed detection result is obtained, an image itself to be a target of damage detection may be composed or may not be composed.

In the first aspect, a plurality of images acquired by subjecting a structure (building) as the subject to split imaging may be received. In a case where the structure (building) is the subject, since an imaging range is wide and a plurality of images are acquired by subjecting the imaging range to split imaging often, the damage diagram creation method according to the invention is effective. Although a bridge, a building, a road, or the like can be exemplified as an example of such a structure, the invention is not limited to these examples. The structure may be a concrete structure.

According to a second aspect, in the damage diagram creation method according to the first aspect, in the step of calculating the composition parameter, information regarding a projective transformation matrix of an image other than a reference image among the plurality of images with respect to the reference image is calculated as the composition parameter. In the second aspect, information (amount, direction, or the like) regarding movement, rotation, and modification of the image other than the reference image with the projective transformation matrix can be calculated as the composition parameter. Furthermore, the reference image can be set based on a position (for example, an image in a corner portion) with respect to the subject, an imaging order (for example, an initially captured image), a feature (an exposure condition, sharpness, or a specific member is captured) of an image, or the like. It is preferable that an imaging surface of the reference image is in a confronting state in an imaging direction; however, the invention is not limited thereto. In a case where the imaging surface of the reference image is not in the confronting state, confronting correction can be performed after composition.

According to a third aspect, the damage diagram creation method according to the first or second aspect further comprises, in the step of calculating the composition parameter, in a case where the composition parameter for composing the plurality of images into one image is unable to be calculated, a step of calculating the composition parameter by composable image group among the plurality of images, and a step of composing the results of the detection by image group based on the composition parameter calculated by image group. According to the third aspect, even though a parameter for composing all images into one image (that is, a parameter for composing the detection results for all images into one detection result) cannot be calculated, it is possible to compose the detection results by composable image group. A case where "the composition parameter cannot be calculated" may include a case where the calculation accuracy of the parameter is low (there is no reliability).

According to a fourth aspect, the damage diagram creation method according to the third aspect further comprises a step of making information obtained by vectorizing the results of the detection be displayed on the plurality of images in a superimposed manner by image group, a step of designating correspondence points for one image group among the displayed image groups and another image group among the image groups, and a step of calculating the composition parameter for composing the one image group and the other image group into one image based on the designated correspondence points, and in the step of composing the results of the detection, results of the detection for the one image group and results of the detection for the other image group are composed based on the composition parameter for composing the image groups into one image. The fourth aspect is to define processing in a case where the composition parameter for composing all of a plurality of images into one image cannot be calculated. The correspondence points are designated (based on a user's operation), and the composition parameter is calculated based on the designated correspondence points, thereby composing the detection results for the one image group and the detection results for the other image group. Since it should suffice that the correspondence points are designated for image groups that cannot be composed, it is possible to enable rapid and easy calculation of the composition parameter to compose the detection results. The designation of the correspondence points can be performed based on a user's operation.

In the fourth aspect, since information obtained by vectorizing the results of the detection is displayed in addition to displaying the images in designating the correspondence points, it is possible to allow the user to view the detection results and to easily perform an operation to designate the correspondence point based on the detection results. As "information obtained by vectorizing the results of the detection", for example, line segments indicating a start point and an end point of damage or a figure (a polygon or the like) constituted of such line segments can be used.

According to a fifth aspect, in the damage diagram creation method according to any one of the first to fourth aspects, in the step of composing the results of the detection, in an area where a plurality of images overlap one another, one of the plurality of overlapping images is selected and the results of the detection are composed. In the area where the plurality of images overlap one another, composition accuracy may be deteriorated, for example, the detection results that should be intrinsically composed into one detection result become complicated due to misregistration of the images; however, in the fifth aspect, in the area where the plurality of images overlap one another, one of a plurality of overlapping images is selected, whereby it is possible to compose the detection results with high accuracy.

According to a sixth aspect, in the damage diagram creation method according to any one of the first to fifth aspects, in the step of receiving the plurality of images, the plurality of images divided into groups are received, in the step of composing the results of the detection, the results of the detection are composed by group, and the damage diagram creation method further comprises a step of outputting the composed results of the detection in association with the groups. In the sixth aspect, since the receipt of the images, the composition of the detection results, and the output of the detection result are performed based on the groups of the images, the correspondence between the received images and the composed detection result is clear, and it is possible to easily manage and use the images and the detection results.

According to a seventh aspect, in the damage diagram creation method according to the sixth aspect, in the step of receiving the plurality of images, images stored in the same folder are received as images belonging to the same group, in the step of composing the results of the detection, the results of the detection are composed for the images stored in the same folder, and in the step of outputting the results of the detection, the composed results of the detection are output to the folder in which the images belonging to the same group are stored. The seventh aspect is to more specifically define the sixth aspect, and enables to more easily manage and use the images and the detection results. The storage of the images in the same folder can be more easily implemented by a user's operation, for example, using the same file management tool (function) as a file management tool in an operating system (OS) of a general computer, and in the seventh aspect, the images stored in the same folder by such a user's operation are received. The folders may be hierarchically constituted like a tree structure.

According to an eighth aspect, the damage diagram creation method according to any one of the first to seventh aspects further comprises a step of composing the plurality of images based on the composition parameter. According to the eighth aspect, in addition to the composed detection result, it is possible to obtain a composite image corresponding to such a detection result.

According to a ninth aspect, the damage diagram creation method according to any one of the first to eighth aspects further comprises a step of outputting the results of the detection in the same format as diagram data including diagram information indicating a shape of the subject. In the ninth aspect, the same format as a computer-aided design (CAD) diagram can be used as "the same format as diagram data including the diagram information indicating the shape of the subject", and the detection results are output in such a format to enable rapid and easy creation of the damage diagram. The detection results output according to the ninth aspect may be composed (mapping) to the CAD diagram.

According to a tenth aspect, the damage diagram creation method according to any one of the first to ninth aspects may further comprise a step of displaying the results of the detection, and a step of outputting the displayed results of the detection, and the step of outputting the results of the detection is performed only in a case where an instruction to output the displayed results of the detection is issued. According to the tenth aspect, the step of outputting the results of the detection is performed only in a case where the instruction to output the displayed results of the detection is issued, whereby it is possible to allow the user to ascertain the detection results through the display and to output only a desired detection result. The detection results can be displayed by characters, numerals, figures, symbols, or the like. The detection results may be vectorized and displayed or may be displayed along with images.

According to an eleventh aspect, the damage diagram creation method according to the tenth aspect further comprises a step of attaching identification information to an image with no output instruction among images corresponding to the results of the detection. With this, an image with no output instruction can be identified.

In order to achieve the above-described object, a twelfth aspect provides a damage diagram creation device comprising an image input unit that receives a plurality of images acquired by split-imaging a subject, a composition parameter calculation unit that calculates a composition parameter for composing the plurality of images based on correspondence points between images, a damage detection unit that detects damage of the subject from each image constituting the plurality of images, and a detection result composition unit that composes results of the detection for the plurality of images based on the composition parameter. According to the twelfth aspect, as in the first aspect, it is possible to detect damage based on a plurality of images acquired by subjecting a subject to split imaging with high accuracy.

According to a thirteenth aspect, in the damage diagram creation device according to the twelfth aspect, the composition parameter calculation unit calculates information regarding a projective transformation matrix of an image other than a reference image among the plurality of images with respect to the reference image as the composition parameter. In the thirteenth aspect, as in the second aspect, information (amount, direction, or the like) regarding movement, rotation, and modification of the image other than the reference image with the projective transformation matrix can be calculated as the composition parameter.

According to a fourteenth aspect, in the damage diagram creation device according to the twelfth or thirteenth aspect, the composition parameter calculation unit calculates the composition parameter by composable image group among the plurality of images in a case where the composition parameter for composing the plurality of images into one image is unable to be calculated, and the detection result composition unit composes the results of the detection by image group based on the composition parameter calculated by image group. According to the fourteenth aspect, as in the third aspect, even though a parameter for composing all images into one image (that is, a parameter for composing the detection results for all images into one detection result) cannot be calculated, it is possible to compose the detection results by composable image group.

According to a fifteenth aspect, the damage diagram creation device according to the fourteenth aspect further comprises a display controller that makes information obtained by vectorizing the results of the detection be displayed on the plurality of images in a superimposed manner by image group, and a correspondence point designation unit that designates correspondence point for one image group among the displayed image groups and another image group among the image groups. The composition parameter calculation unit calculates the composition parameter for composing the one image group and the other image group into one image based on the designated correspondence points, and the detection result composition unit composes results of the detection for the one image group and results of the detection for the other image group based on the composition parameter for composing the one image group and the other image group into one image. According to the fifteenth aspect, as in the fourth aspect, it is possible to enable rapid and easy calculation of the composition parameter to compose the detection results, and to enable easy viewing of the detection results and designation of the correspondence point based on the detection results.

In order to achieve the above-described object, a sixteenth aspect provides a damage diagram creation system comprising a server and a client. The client comprises an image input unit that receives a plurality of images acquired by split-imaging a subject. The server comprises an image acquisition unit that acquires the plurality of images from the client, a composition parameter calculation unit that calculates a composition parameter for composing the plurality of acquired images based on correspondence points between images, a damage detection unit that detects damage of the subject from each image constituting the plurality of images, a detection result composition unit that composes results of the detection for the plurality of images based on the composition parameter, and a detection result output unit that outputs the results of the detection to the client. According to the sixteenth aspect, as in the first aspect and the twelfth aspect, it is possible to detect damage based on a plurality of images acquired by subjecting a subject to split imaging with high accuracy. In the sixteenth aspect, it is possible to use equipment (an information terminal), such as a personal computer, a tablet terminal, or a smartphone, into which image is input and which receives a result from the server, as the client, and to use a computer connected to the client through a network as the server.

According to a seventeenth aspect, in the damage diagram creation system according to the sixteenth aspect, the composition parameter calculation unit calculates information regarding a projective transformation matrix of an image other than a reference image among the plurality of images with respect to the reference image as the composition parameter. In the seventeenth aspect, as in the second aspect, information (amount, direction, or the like) regarding movement, rotation, and modification of the image other than the reference image with the projective transformation matrix can be calculated as the composition parameter.

According to an eighteenth aspect, in the damage diagram creation system according to the sixteenth or seventeenth aspect, the composition parameter calculation unit calculates the composition parameter by composable image group among the plurality of images in a case where the composition parameter for composing the plurality of images into one image is unable to be calculated, and the detection result composition unit composes the results of the detection by image group based on the composition parameter calculated by image group. According to the eighteenth aspect, as in the third aspect, even though a parameter for composing all images into one image (that is, a parameter for composing the detection results for all images into one detection result) cannot be calculated, it is possible to compose the detection results by composable image group.

According to a nineteenth aspect, in the damage diagram creation system according to the eighteenth aspect, the server further comprises a display controller that makes information obtained by vectorizing the results of the detection be displayed on the plurality of images in a superimposed manner by image group, and a correspondence point designation unit that designates correspondence point for one image group among the displayed image groups and another image group among the image groups. The composition parameter calculation unit calculates the composition parameter for composing the one image group and the other image group into one image based on the designated correspondence points, and the detection result composition unit composes results of the detection for the one image group and results of the detection for the other image group based on the composition parameter for composing the one image group and the other image group into one image. According to the nineteenth aspect, as in the fourth aspect, it is possible to enable rapid and easy calculation of the composition parameter to compose the detection results, and to enable easy viewing of the detection results and designation of the correspondence points based on the detection results. The superimposed display of the vectorized information and the images can be performed, for example, by a display device in the client.

According to a twentieth aspect, in the damage diagram creation system according to any one of the sixteenth to nineteenth aspects, the image acquisition unit of the server acquires the plurality of images divided into groups from the client, the detection result composition unit of the server composes the results of the detection by group, and the detection result output unit of the server outputs the composed results of the detection to the client in association with the groups. According to the twentieth aspect, as in the sixth aspect, it is possible to easily manage and use the images and the detection results.

According to a twenty-first aspect, in the damage diagram creation system according to the twentieth aspect, the image acquisition unit of the server acquires images stored in the same folder as image belonging to the same group, the detection result composition unit of the server composes the results of the detection by image stored in the same folder, and the detection result output unit of the server outputs the composed results of the detection for the images stored in the same folder to the same folder of the client. According to the twenty-first aspect, as in the seventh aspect, it is possible to easily manage and use the images and the detection results. The storage of the images in the folder can be easily implemented by a user's operation, for example, by providing the same file management tool (function) as a file management tool in an operating system of a general computer in the client.

In order to achieve the above-described object, a twenty-second aspect provides a recording medium in which a computer-readable code of a program causing a computer to execute the damage diagram creation method according to any one of the first to eleventh aspects is recorded. According to the twenty-second aspect, as in the first aspect, it is possible to detect damage based on a plurality of images acquired by subjecting a subject to split imaging with high accuracy, and in a case where the same configuration as in the second aspect to the eleventh aspect, it is possible to obtain the same effects as in the aspects. As the recording medium according to the twenty-second aspect, non-transitory recording mediums, such as various magneto-optical recording mediums and a semiconductor recording medium, can be used.

As described above, with the damage diagram creation method, the damage diagram creation device, the damage diagram creation system, and the recording medium of the invention, it is possible to detect damage based on a plurality of images acquired by subjecting a subject to split imaging with high accuracy.

BRIEF DESCRIPTION OF THE DRAWINGS

FIG. 16 is a diagram showing an example of image arrangement by image group.

FIG. 18 is a diagram showing an aspect in which vectorized detection results are displayed on images in a superimposed manner.

FIGS. 22A to 22C are another diagrams showing composition of detection results.

DESCRIPTION OF THE PREFERRED EMBODIMENTS

Hereinafter, an embodiment of a damage diagram creation method, a damage diagram creation device, a damage diagram creation system, and a recording medium according to the invention will be described in detail referring to the accompanying drawings.

<Structure of Bridge>

Figure 1:
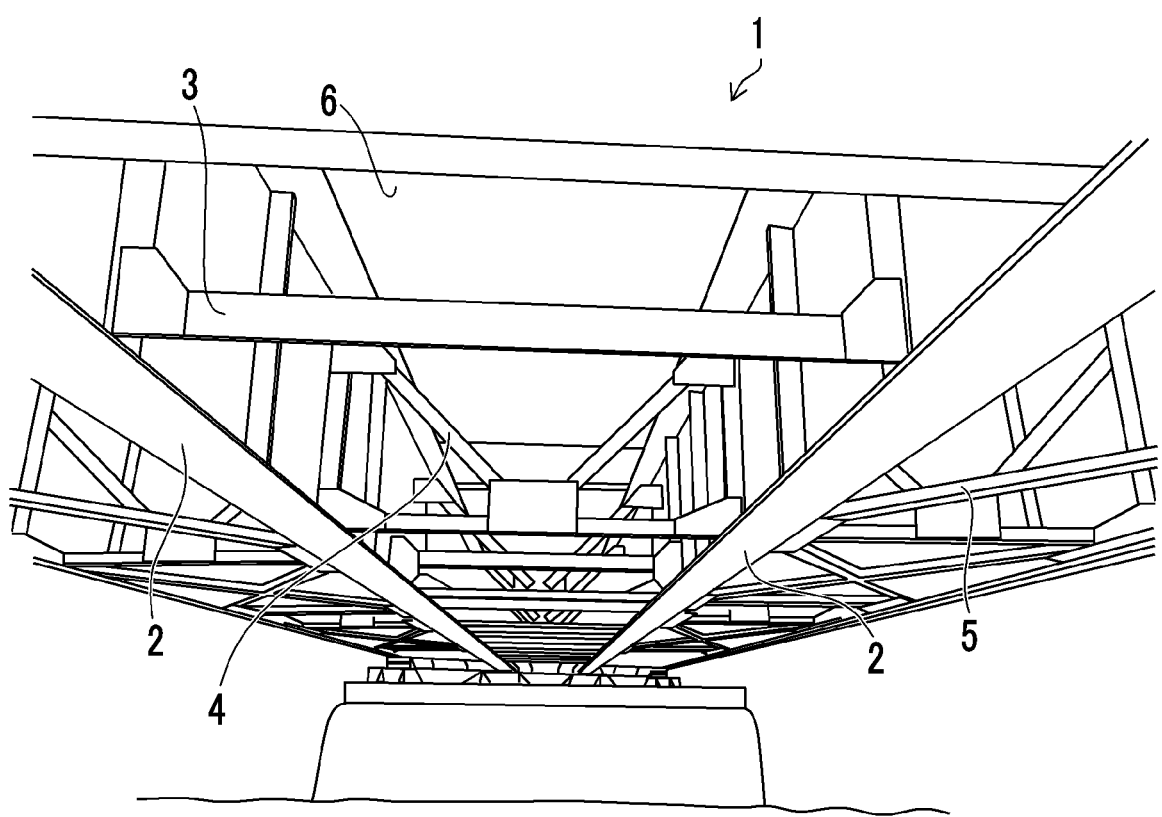
FIG. 1 is an appearance diagram of a bridge when viewed from a lower surface.

FIG. 1 is a perspective view showing a state in which a bridge 1 as one of structures is viewed from below. The bridge 1 shown in FIG. 1 has a stereoscopic structure of main girders 2, cross beams 3, cross frames 4, lateral frames 5, and deck slabs 6, and these members are connected by bolts, rivets, or welding. The deck slabs 6 on which vehicles and the like travel are installed on the main girders 2 or the like. The deck slabs 6 are generally made of reinforced concrete. The main girder 2 is a member that is laid between abutments or bridge piers and supports the load of vehicles and the like on the deck slab 6, and has a surface (a surface in a vertical direction) perpendicular to a surface (horizontal plane) of the deck slab 6. The cross beam 3 is a member that connects the main girders 2 to support a load by a plurality of main girders 2. The cross frame 4 and the lateral frame 5 are members that connect the main girders 2 to resist a lateral load of wind and earthquake, respectively. In the embodiment, although a case where the bridge 1 is a target (subject) has been described, a structure as a target is not limited to the bridge, and may be a tunnel, a building, a road, or the like.

<Acquisition of Images>

In a case of capturing images of the bridge 1 and detecting damage, an inspector images the bridge 1 from below using a digital camera 100 (see FIG. 2), and splits and acquires a plurality of captured images (a plurality of images obtained by imaging different portions of the bridge 1) for an inspection range. Imaging is performed while suitably moving in an extension direction of the bridge 1 and a direction perpendicular to the extension direction. In a case where the inspector hardly moves due to surrounding circumstances of the bridge 1, the digital camera 100 may be provided in a moving object capable of moving along the bridge 1 to perform imaging. Such a moving object may be provided with an elevating mechanism and a rotating mechanism (a mechanism that performs pan and tilt) of the digital camera 100. Although a vehicle, a robot, and a flying object (a drone or the like) can be exemplified as an example of the moving object, the invention is not limited thereto.

<Configuration of Damage Diagram Creation System>

Figure 2:
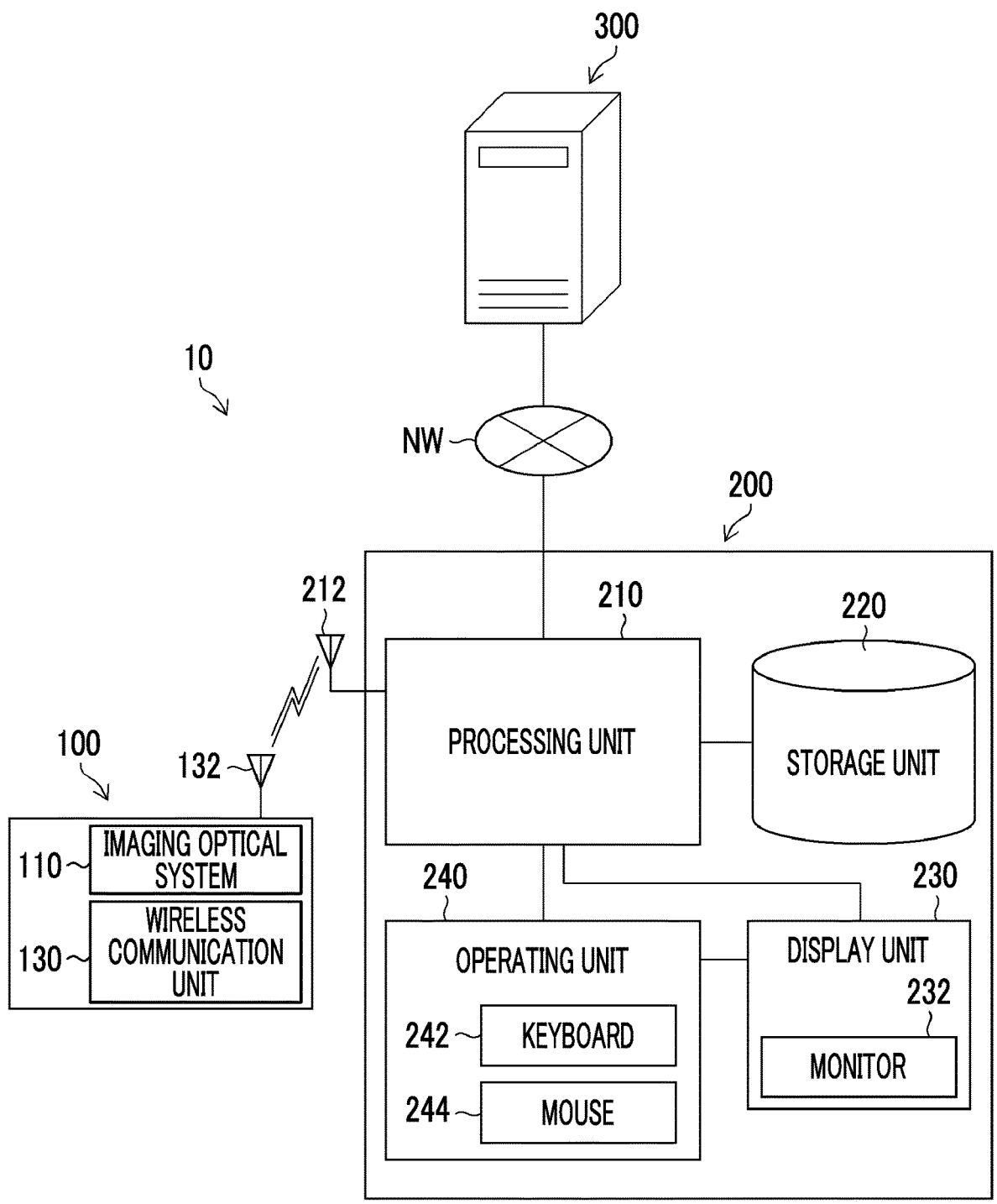
FIG. 2 is a block diagram showing the configuration of a damage diagram creation system according to a first embodiment.

FIG. 2 is a block diagram showing the schematic configuration of a damage diagram creation system 10 (damage diagram creation system). The damage diagram creation system 10 is a system that comprises a digital camera 100, a client 200, and a server 300, and performs detection of damage, composition of detection results, and the like for a plurality of images acquired by subjecting a subject to split imaging to create a damage diagram. In the damage diagram creation system 10, equipment (information terminal), such as a personal computer, a tablet terminal, or a smartphone, which inputs images and receives results from the server 300, can be used as the client 200, and a computer connected to the client 200 through a network can be used as the server 300.

<Configuration of Digital Camera>

The digital camera 100 acquires an image with an imaging optical system 110 comprising an imaging lens and an imaging element (not shown). As an example of the imaging element, a charge coupled device (CCD) type imaging element and a complementary metal-oxide semiconductor (CMOS) type imaging element can be exemplified. A color filter of red (R), G (green), or blue (B) is provided on a light receiving surface of the imaging element, and a color image of the subject can be acquired based on a signal of each color. The digital camera 100 performs wireless communication with the client 200 through a wireless communication unit 130 and an antenna 132, and a captured image is input to a processing unit 210 and is subjected to processing described below. The digital camera 100 may be assembled in a housing different from the client 200 or may be integrated with the client 200.

<Overall Configuration of Client>

The client 200 comprises the processing unit 210, a storage unit 220, a display unit 230, and an operating unit 240, and these units are connected to one another such that needed information is transmitted and received. The client 200 performs wireless communication with the digital camera 100 through an antenna 212 and acquires captured images captured by the digital camera 100. The client 200 is connected to the server 300 through a network NW, and performs transmission of acquired images to the server 300 and transmission and reception of processing results (composition detection results, a composite image, and the like) on the transmitted image, a processing request and a response, and the like to and from the server 300.

<Configuration of Processing Unit>

Figure 3:
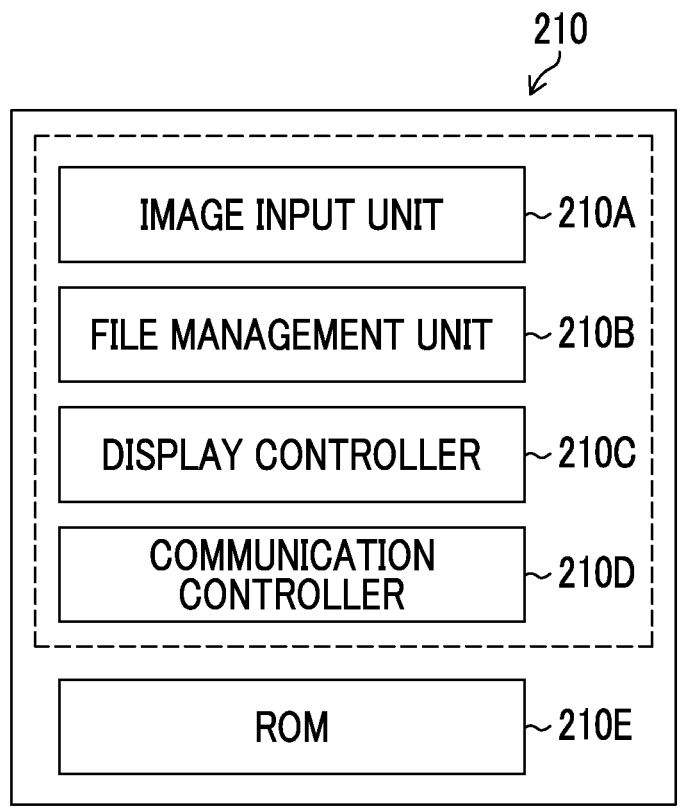
FIG. 3 is a diagram showing the configuration of a processing unit.

FIG. 3 is a diagram showing the configuration of the processing unit 210. The processing unit 210 comprises an image input unit 210A (image input unit), a file management unit 210B, a display controller 210C, and a communication controller 210D, and performs transmission of captured images acquired by the digital camera 100 to the server 300, reception of processing results, display control of the processing results on a monitor 232, and the like. The image input unit 210A inputs the captured images (a plurality of images obtained by subjecting the bridge 1 to split imaging) of the bridge 1 from the digital camera 100 (or a recording medium, a network, or the like). The file management unit 210B creates folders according to a user's operation through a keyboard 242 and/or a mouse 244. The display controller 210C performs display control of the acquired images, the received processing results, and the like on the monitor 232. The communication controller 210D transmits and receives images and information to and from the digital camera 100 through an antenna 212, and transmits images and information to and from the server 300 through the network NW. A read only memory 210E (ROM, a non-transitory recording medium), a computer-readable code of a program (a program for executing the damage diagram creation method according to the embodiment of the invention or including a part thereof) needed for processing of image acquisition, transmission and reception, and the like is recorded.

As will be described below in detail concerning the server 300, the functions of the processing unit 210 described above can be implemented by various processors or electric circuits referring to software recorded on the recording medium.

<Configuration of Storage Unit>

Figure 4:
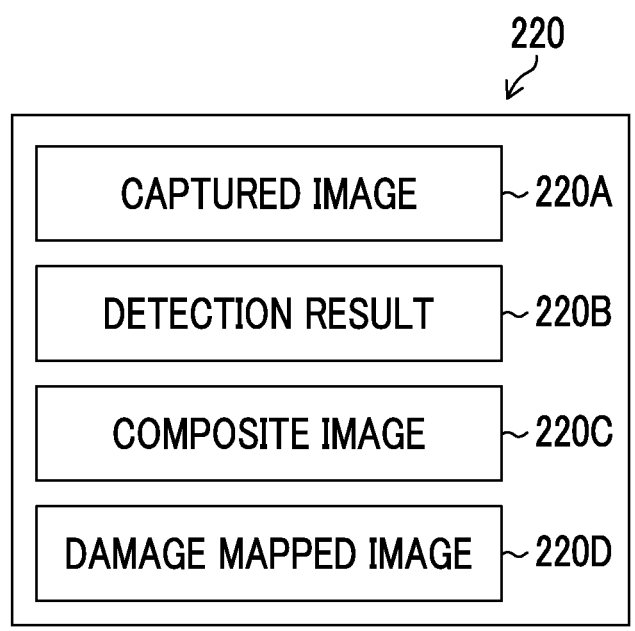
FIG. 4 is a diagram showing information that is stored in a storage unit.

The storage unit 220 is constituted of a non-transitory recording medium, such as a compact disk (CD), a digital versatile disk (DVD), a hard disk, or various semiconductor memories, and a controller thereof, and stores images and information shown in FIG. 4 in association with each other. Captured images 220A are a plurality of images obtained by subjecting the bridge 1 (the portion of the deck slab 6) as the subject to split imaging with the digital camera 100 and input by the image input unit 210A. Instead of the images input by the digital camera 100 and the image input unit 210A, images acquired by way of a network or a recording medium may be stored. A detection result 220B includes a detection result of damage for each image constituting the captured images 220A and a detection result obtained by composing the detection results for the images. A composite image 220C is an image (including a partially composed image group) obtained by composing the captured images. A damage mapped image 220D is an image to which information (detection results and the like) indicating damage is mapped. The images and information can be stored in the folders (see FIGS. 10 and 11).

<Configuration of Display Unit and Operating Unit>

The display unit 230 comprises the monitor 232 (display device), and can display input images, the images and information stored in the storage unit 220, results of processing in the server 300, and the like. The operating unit 240 includes the keyboard 242 and the mouse 244 as an input device and a pointing device, and the user can perform operations needed for executing the damage diagram creation method according to the embodiment of the invention, such as creation of folders, storage of images in the folders, and designation of correspondence points, through the devices and a screen of the monitor 232 (this will be described below).

<Configuration of Server>

Figure 5:
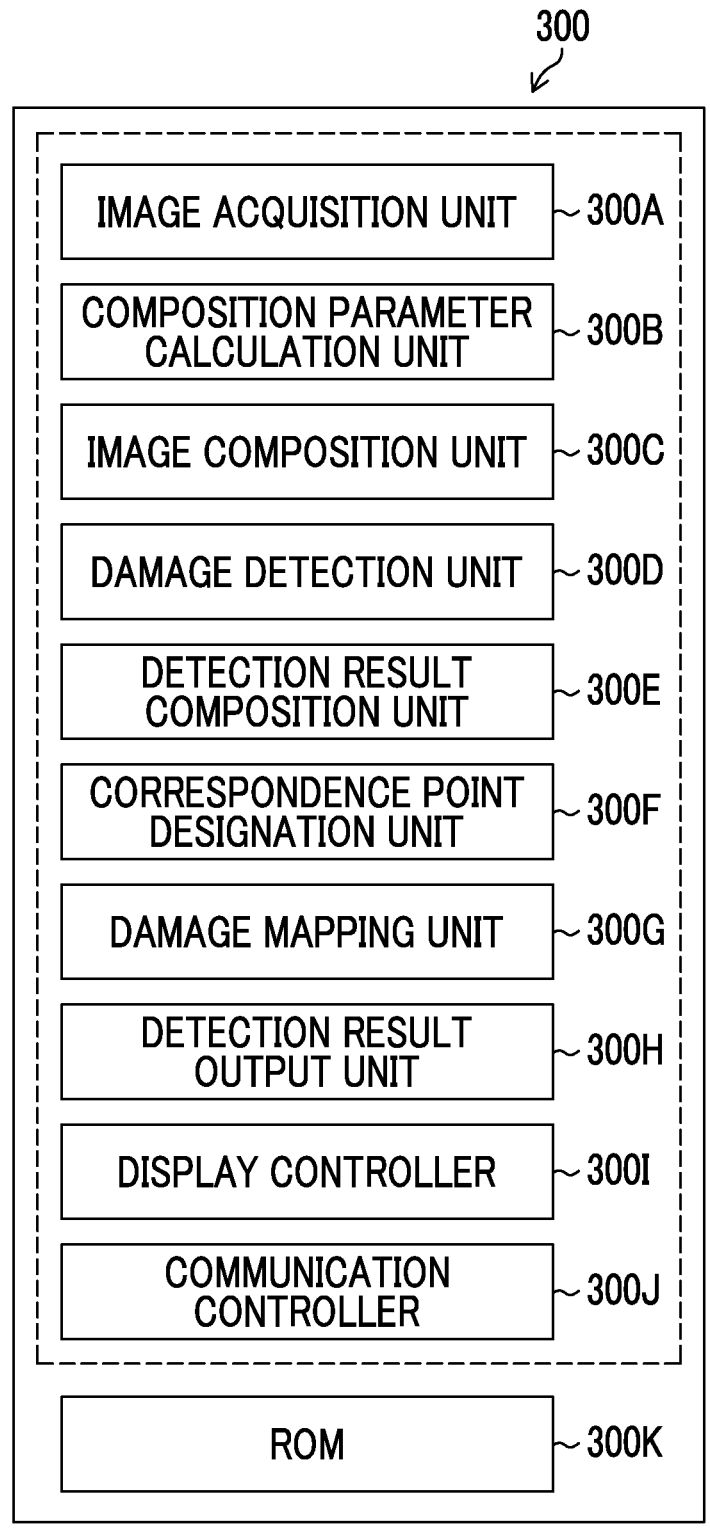
FIG. 5 is a diagram showing the configuration of a server.

FIG. 5 is a diagram showing the configuration of the server 300. The server 300 comprises an image acquisition unit 300A (image acquisition unit), a composition parameter calculation unit 300B (composition parameter calculation unit), an image composition unit 300C, a damage detection unit 300D (damage detection unit), a detection result composition unit 300E (detection result composition unit), and a correspondence point designation unit 300F (correspondence point designation unit). The server 300 further comprises a damage mapping unit 300G, a detection result output unit 300H (detection result output unit), a display controller 300I (display controller), a communication controller 300J, and a ROM 300K (non-transitory recording medium). The server 300 is connected to the client 200 through the network NW, and acquires captured images (the captured images 220A of FIG. 4) from the client 200 to perform detection of damage, composition of the detection results, and the like.

The server 300 may be installed at the same place as the client 200 or may be installed at a place different from the client 200. For example, the server 300 may be installed inside the same room, yard, or site as the client 200 or may be installed at a remote place (including a foreign country). That is, the installation places of the server 300 and the client 200 do not cause problems as long as the server 300 and the client 200 can perform communication through a network. The type of the network NW is not particularly limited, and various networks, such as a local area network (LAN), a wide area network (WAN), and the Internet, can be used.

The image acquisition unit 300A receives the captured images (the captured image 220A of FIG. 4) as input from the client 200. The composition parameter calculation unit 300B calculates a composition parameter for composing the captured images based on correspondence points between images. The image composition unit 300C composes the captured images based on the composition parameter. The damage detection unit 300D detects (extracts and measures) damage (crack, peeling, corrosion, or the like) of the subject (bridge 1) from the captured images. The detection result composition unit 300E composes detection results (results of detection) of damage for the captured images based on the composition parameter calculated by the composition parameter calculation unit 300B. The correspondence point designation unit 300F designates correspondence points for one image group among displayed image groups and another image group among the image groups based on a user's instruction input. The damage mapping unit 300G maps information indicating damage to the composite image. The detection result output unit 300H outputs the detection results of damage, the composed detection result, identification information, the composite image, the damage mapped image, and the like to the client 200. The display controller 300I makes the monitor 232 (display device) display the captured images, the detection results, and the like. The communication controller 300J transmits and receives images and information to and from the client 200 through the network NW. In the ROM 300K (non-transitory recording medium), computer-readable codes of various programs for the operation of the damage diagram creation system 10, such as a damage diagram creation program for executing the damage diagram creation method according to the embodiment of the invention, are recorded. The server 300 comprises a recording device (for example, a magneto-optical recording medium, such as a hard disk) (not shown) in addition to the above-described units, and records the images and information acquired from the client 200 and processing results (the detection results of damage, or the like) in the units of the server 300. The recorded images and the like can be transmitted to the client 200 according to a request.

Functions of the units of the server 300 described above can be implemented using various processors. Various processors include, for example, a central processing unit (CPU) that is a general-purpose processor executing software (program) to implement various functions. Various processors described above also include a programmable logic device (PLD) that is a processor capable of changing a circuit configuration after manufacture, such as a field programmable gate array (FPGA). In addition, a dedicated electric circuit that is a processor having a circuit configuration dedicatedly designed for executing specific processing, such as an application specific integrated circuit (ASIC), and the like are also included in various processors described above.

The functions of the units may be implemented by one processor or may be implemented by combining a plurality of processors. A plurality of functions may be implemented by one processor. As an example where a plurality of functions are constituted of one processor, first, as represented by a computer, such as a client or a server, there is a form in which one processor is constituted of a combination of one or more CPUs and software, and the processor implements a plurality of functions. Secondly, as represented by system on chip (SoC) or the like, there is a form in which a processor that implements all functions of a system into one integrated circuit (IC) chip is used. In this way, various functions are constituted using one or more processors among various processors described above as a hardware structure. In addition, the hardware structure of various processors is, more specifically, an electric circuit (circuitry) in which circuit elements, such as semiconductor elements, are combined.

In a case where the above-described processor or the electric circuit executes software (program), a processor (computer) readable code of software to be executed (including a program for executing the damage diagram creation method according to the embodiment of the invention) is stored in a non-transitory recording medium, such as the ROM 300K (see FIG. 5), and the processor refers to software. The code may be recorded in a non-transitory recording medium, such as various magneto-optical recording devices or a semiconductor memory, instead of the ROM 300K. In processing using software, for example, a random access memory (RAM) is used as a temporary storage area, and data stored in, for example, an electronically erasable and programmable read only memory (EEPROM) is referred to. In FIG. 5, devices, such as the RAM and the EEPROM, are not shown.

The functions of the client 200 described above can be implemented by various processors, electric circuits, and software similarly to the server 300.

<Procedure of Image Processing>

Figure 6:
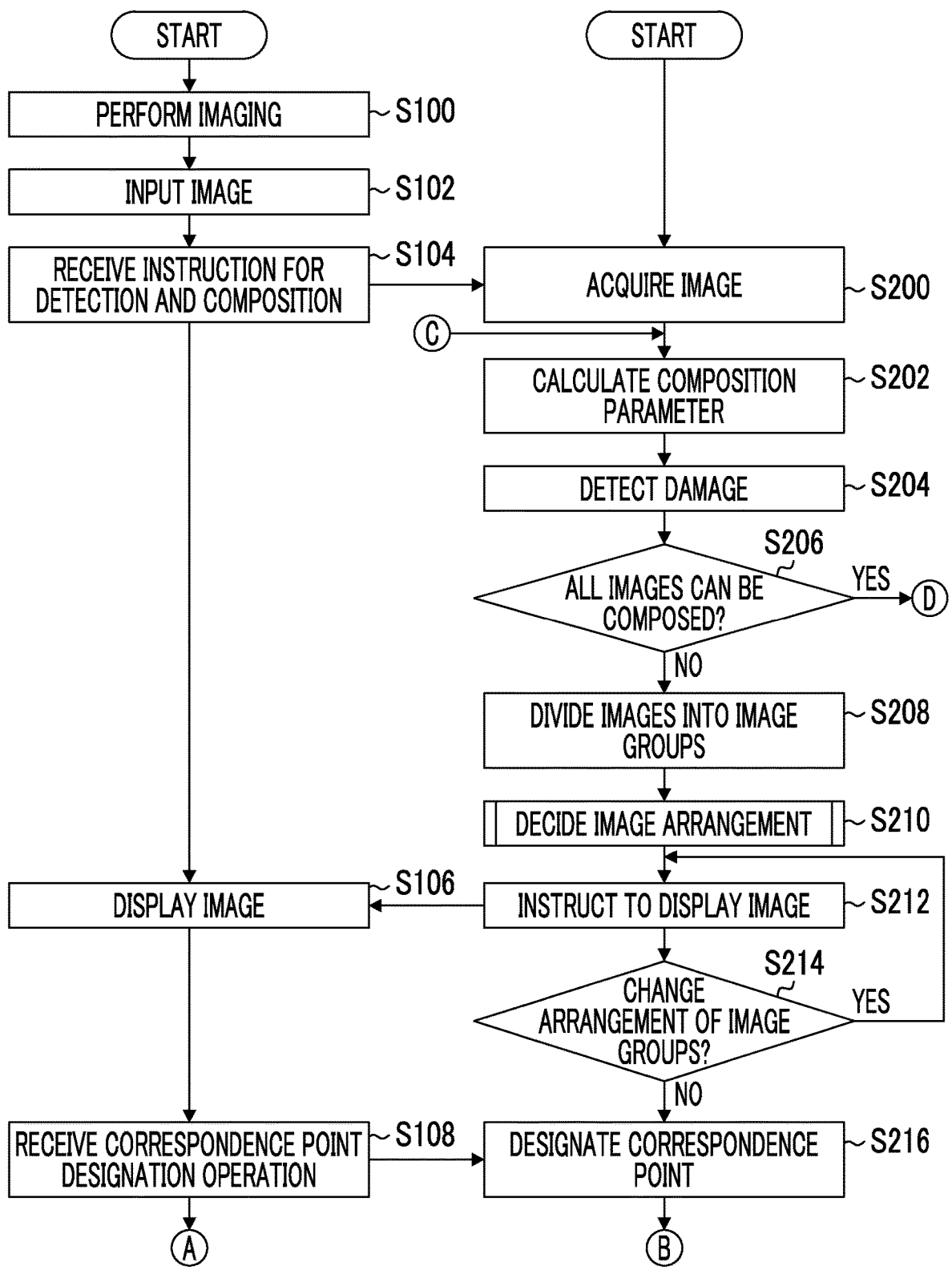
FIG. 6 is a diagram showing a flowchart of a damage diagram creation method according to the first embodiment.
Figure 7:
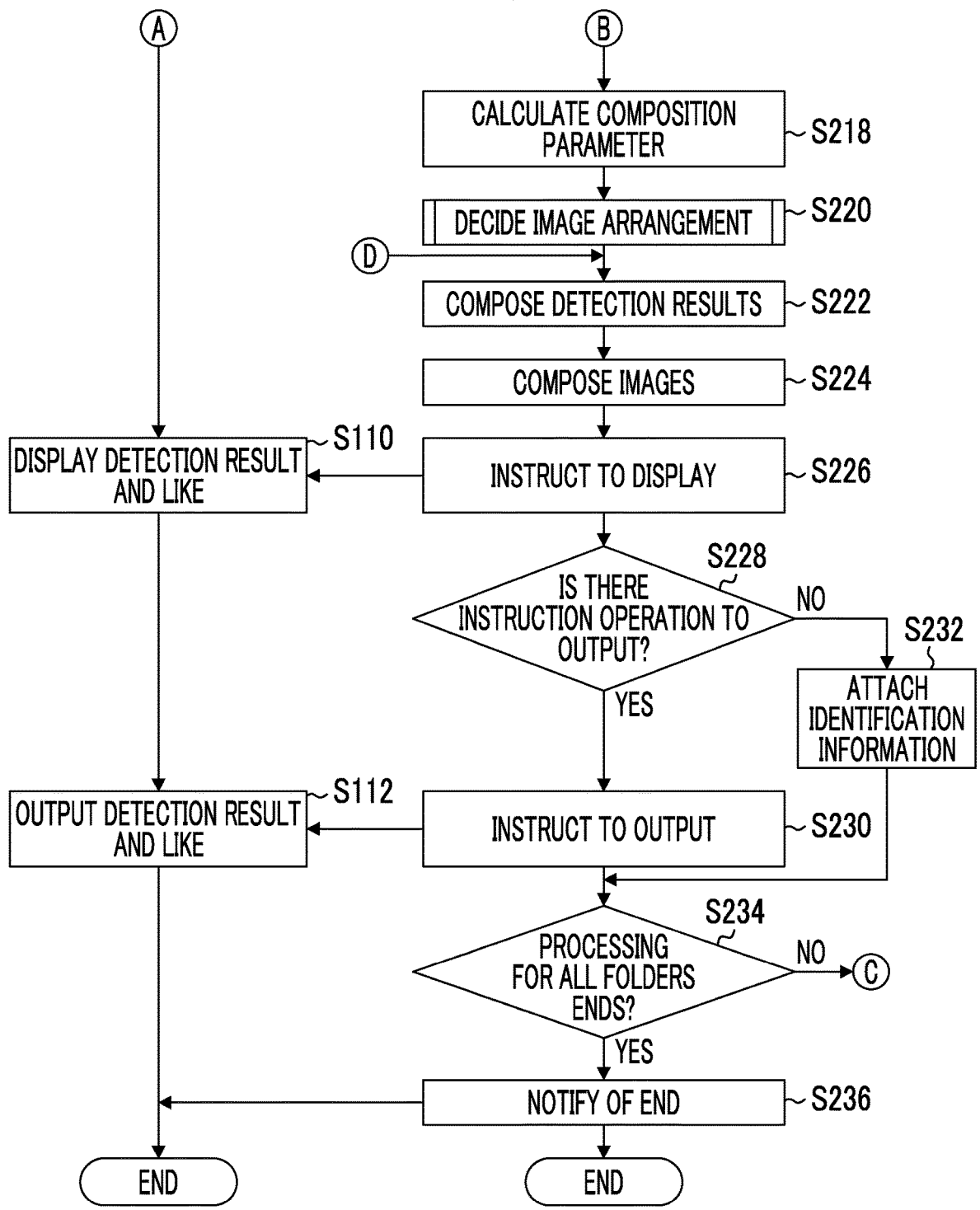
FIG. 7 is another diagram showing the flowchart of the damage diagram creation method according to the first embodiment.

Image processing in the damage diagram creation system 10 will be described. FIGS. 6 and 7 are flowcharts showing a procedure of the image processing (including steps of the damage diagram creation method according to the embodiment of the invention). In the drawings, Steps S100 to S112 show processing in the client 200, and Steps S200 to S236 show processing in the server 300.

<Imaging>

In the procedures shown in FIGS. 6 and 7, a plurality of captured images are acquired by subjecting the bridge 1 (structure) to split imaging with the digital camera 100 (Step S100).

Figure 8:
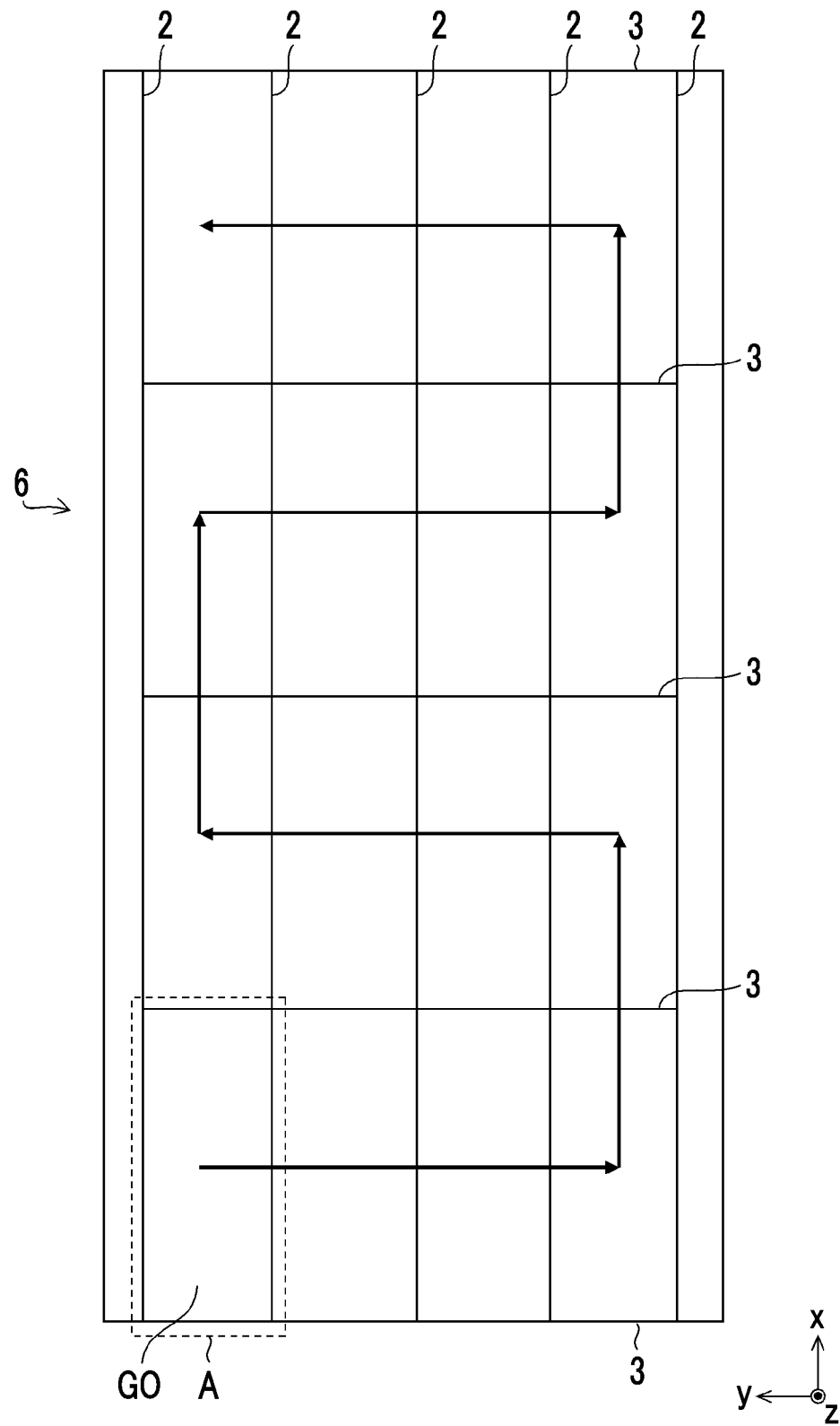
FIG. 8 is a diagram showing an example of an imaging procedure of a deck slab.

In the embodiment, a case where the deck slab 6 is imaged will be described. FIG. 8 is a diagram showing an example of an imaging procedure of the deck slab 6. FIG. 8 shows an aspect in which imaging is performed in units of an area A including a panel GO defined by the main girders 2 (members extending in an x direction) and the cross beams 3 (members extending in a y direction), and imaging is repeated while sequentially moving an imaging area in the y direction and the x direction (in directions of arrows). In a case where images of the entire imaging range can be acquired, imaging may be performed in other procedures. In FIG. 8, the extension direction of the bridge 1 (deck slab 6) is referred to as x, a direction perpendicular to x within the surface of the deck slab 6 is referred to as y, a direction (vertical downward direction) perpendicular to deck slab 6 is referred to as z, and coordinates in a right-hand system are constituted of (x,y,z).

Figure 9:
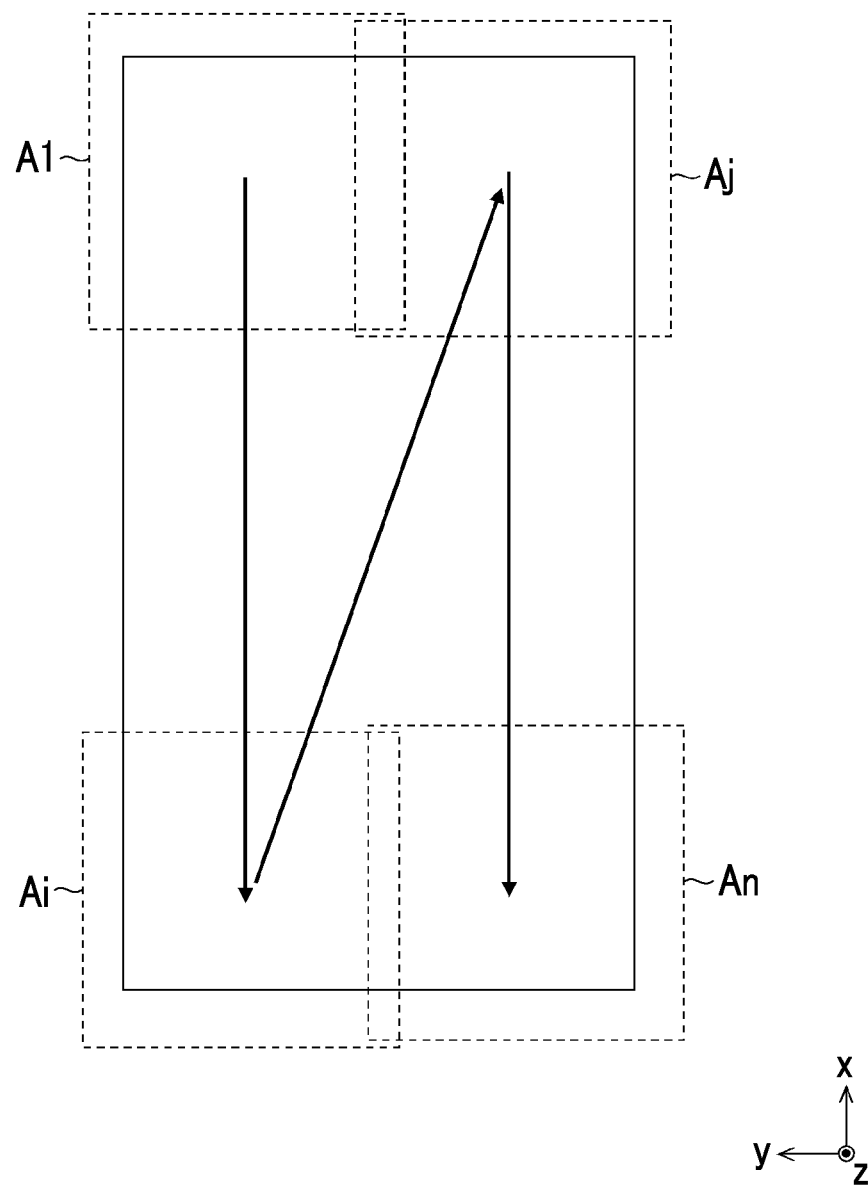
FIG. 9 is a diagram showing an example of an imaging procedure of a panel.

FIG. 9 is a diagram showing an example of an imaging procedure in one panel GO. In the example of FIG. 9, imaging is performed while the inspector or the moving object moves from an area A1 in a +x side end portion of the panel GO to an area Ai in an −x direction end portion, returns to the +x side end portion again, and moves from an area Aj to an area An in the −x direction end portion, thereby capturing n (where n is an integer equal to or greater than two) images in total. Imaging may be performed in a pattern (for example, in an order of areas A1 to Ai and An to Aj) different from the above-described pattern. In imaging, an imaging position may be moved and a confronting image may be continuously captured each time one image is captured, or a plurality of images may be captured while changing an imaging direction at one imaging position (in this case, an image captured in an inclined direction is included). Furthermore, in imaging, it is preferable that the imaging position and the imaging direction are appropriately set to cause a sufficient (for example, about 30%) overlap between adjacent images, and the correspondence points are detected and set ease and with high accuracy.

Figure 10:
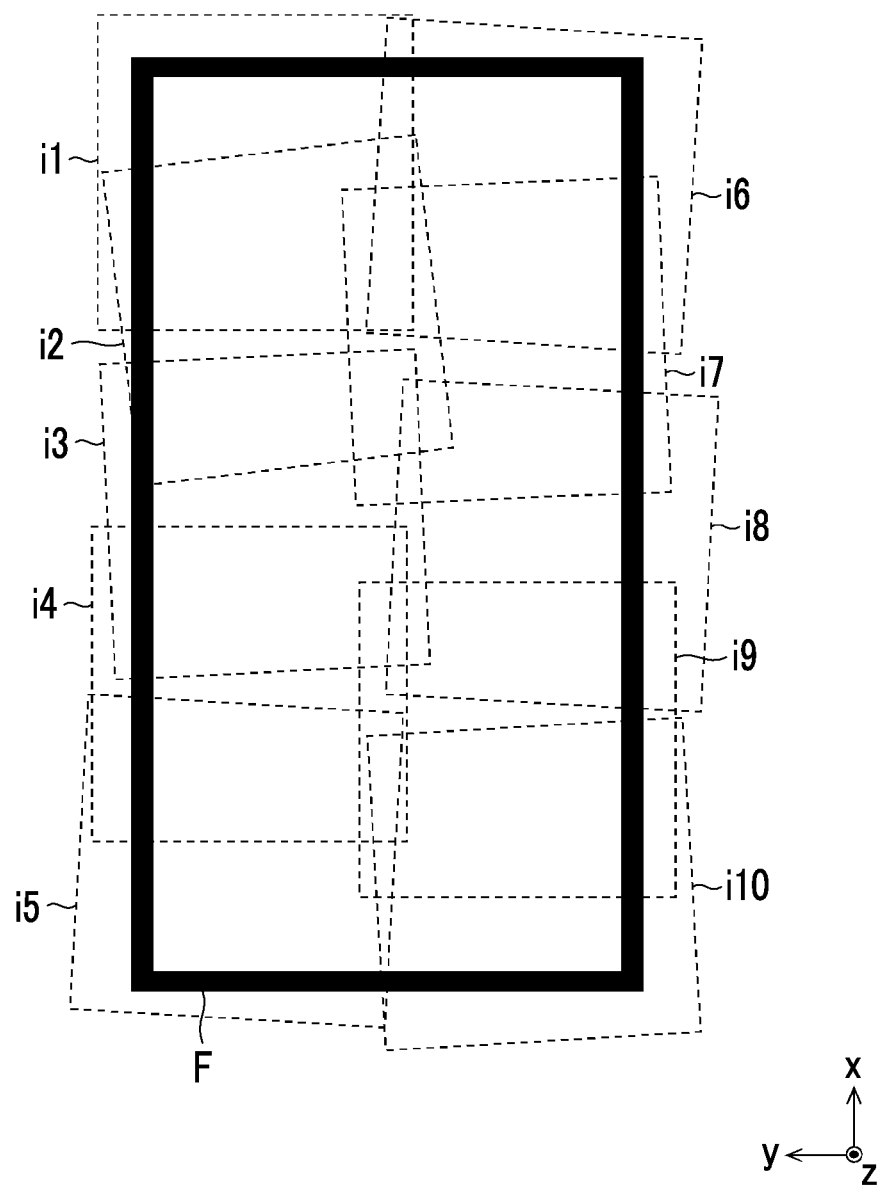
FIG. 10 is a diagram showing an imaging range of each image.
Figure 11:
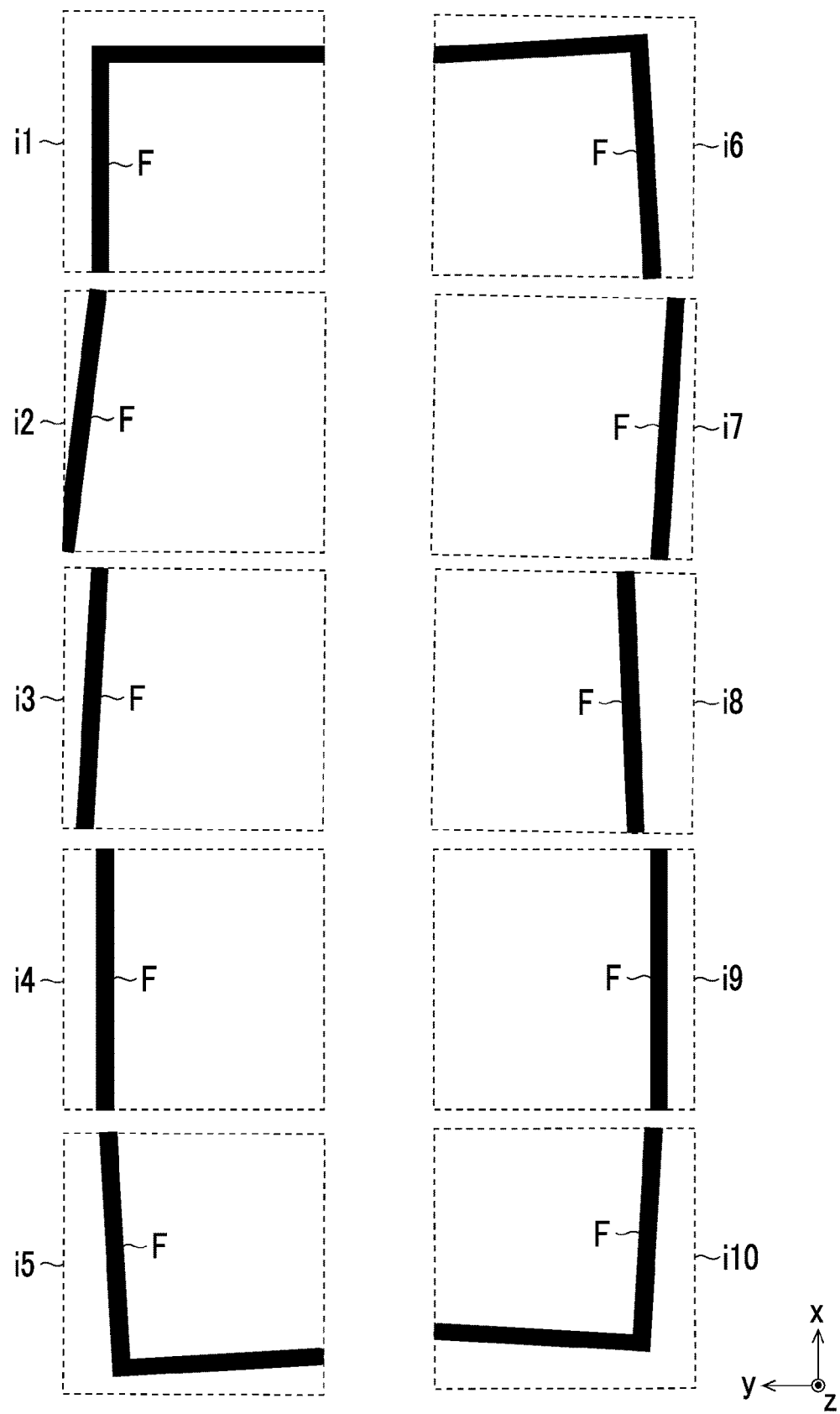
FIG. 11 is a diagram showing each captured image.

FIG. 10 shows an example of captured images, and shows an aspect in which ten images of images i1 to i10 are captured while securing an overlap. FIG. 11 is a diagram showing the images i1 to i10 individually. In FIGS. 10 and 11, a frame F (a rectangular shape defined by the main girders 2 and the cross beams 3) of the panel GO is shown, and damage that occurs in other members and the floorboards is omitted.

The client 200 receives a plurality of captured images described above as input through the digital camera 100 (the imaging optical system 110, the wireless communication unit 130, and the antenna 132) and the processing unit 210 (the communication controller 210D, the image input unit 210A, and the antenna 212) (Step S102).

<Storage of Images and Information>

Figure 12:
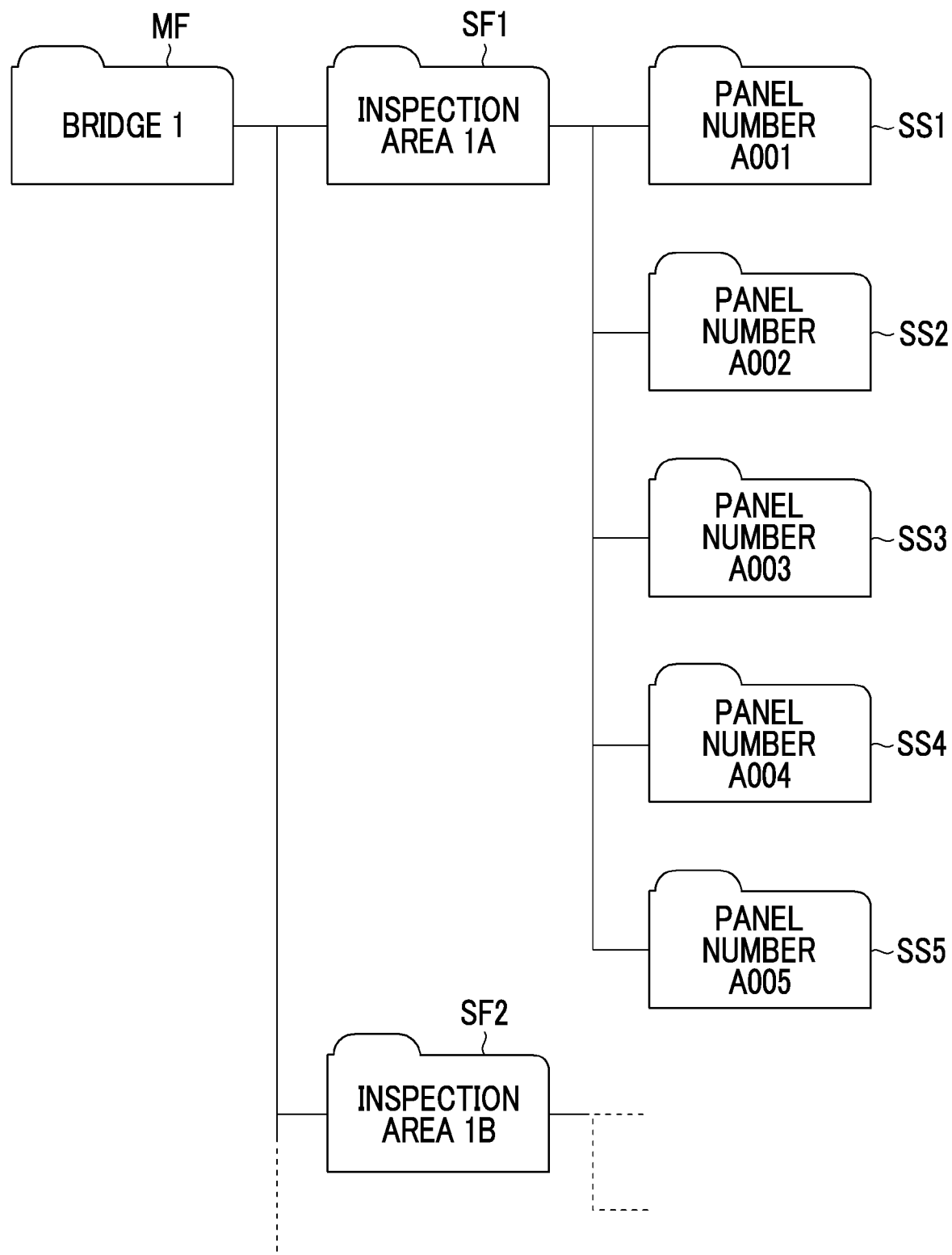
FIG. 12 is a diagram showing a hierarchical structure of a folder.
Figure 13:
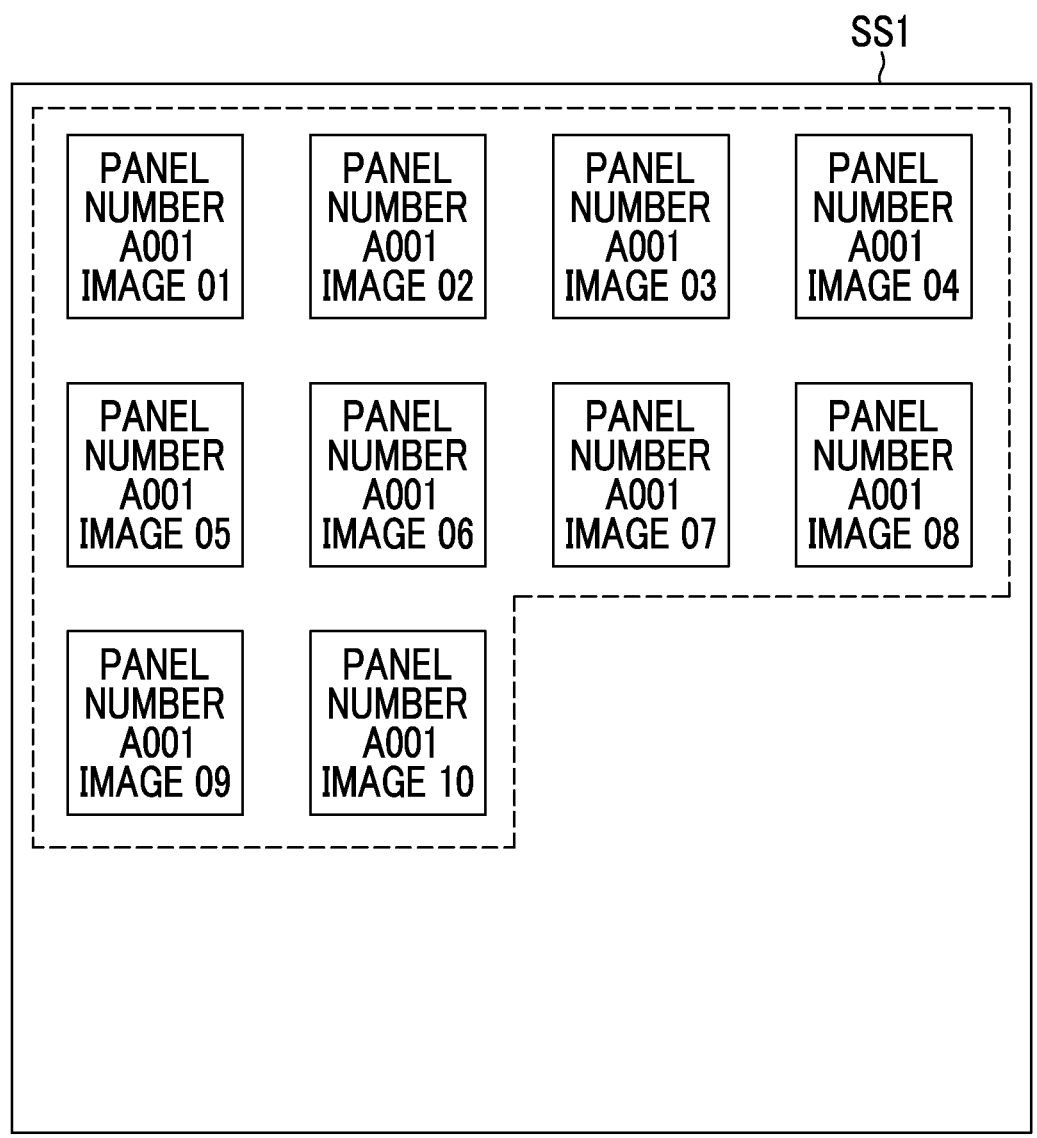
FIG. 13 is a diagram showing an aspect in which captured images are stored in a folder.

In the damage diagram creation system 10, folders are created in the storage unit 220 of the client 200, and the captured images are stored in the folders. FIG. 12 is a diagram showing an example of a folder structure. In the example of FIG. 12, a main folder MF is created for the entire bridge 1, and subfolders SF1 and SF2 are created for respective imaging areas (inspection area 1A and inspection area 1B) in the main folder. In the subfolder of each imaging area, subfolders SS1 to SS5 are further created for the respective panels GO defined by the main girders 2 and the cross beams 3, and the captured images are stored in the subfolders SS1 to SS5. FIG. 13 shows an aspect in which ten captured images are stored for a panel (subfolder SS1) having a panel number of A001. The folder structure shown in FIGS. 12 and 13 can be created by the file management unit 210B according to an operation on the operating unit 240 (the keyboard 242 and the mouse 244). The folder configuration may be implemented as an aspect different from the example of FIGS. 12 and 13, and for example, a subfolder may be created for each member number. As will be described below in detail, in the damage diagram creation system 10, the detection results (the results of the detection) of damage are composed for each folder (a subfolder is included in a "folder"), and the composed detection result is stored in the same folder as the captured image.

<Image Acquisition>

The operating unit 240 of the client 200 receives an instruction operation for damage detection and composition through the keyboard 242 and/or the mouse 244 (Step S104), and the server 300 (the image acquisition unit 300A) acquires the captured images according to the operation (Step S200). The image acquisition unit 300A acquires the images stored in the same folder of the client 200 (the storage unit 220) as images belonging to the same group. For example, the ten captured images stored in the subfolder SS1 shown in FIGS. 12 and 13 are acquired as the images belonging to the same group.

<Calculation of Composition Parameter>

After the captured images are acquired in Step S200, the server 300 (the composition parameter calculation unit 300B) calculates the composition parameter for composing a plurality of images based on the correspondence points between the images (Step S202). For example, a projective transformation matrix of another image with respect to a reference image among the captured images can be calculated as the composition parameter. In a flowchart of FIG. 6, although an example where the composition parameter calculation of Step S202 is performed earlier has been described, damage detection of Step S204 may be performed earlier or Steps S202 and S204 may be performed in parallel.

<Detection of Damage>

The server 300 (damage detection unit 300D) detects (extracts and measures) damage from the acquired captured images (Step S204). Although peeling, water leakage, crack, rust, or the like can be exemplified as a classification of damage, the type of damage to be specifically detected may be set according to the conditions of the type, feature, purpose of inspection, and the like of the structure (subject). Although examples of items to be detected include a position, a size, a direction, a range, a shape, and the like, detection items may also be set according to the classification of damage or according to the conditions of the type, feature, purpose of inspection, and the like of the structure. In the detection of damage, the damage detection unit 300D vectorizes the detection results (the results of the detection), and represents each detection result by a line segment having a start point and an end point, a set of line segments (in a case of linear damage, such as a crack), or a figure (in a case of damage having a spread, such as peeling or corrosion), such as a polygon, constituted of the line segments.

Although detection of damage can be performed by various methods according to the classification, in regard to crack, for example, a crack detection method described in JP4006007B can be used. The method is a crack detection method having a step of creating a wavelet image and a step of determining a crack area based on the wavelet image. In the step of creating the wavelet image, wavelet coefficients corresponding to two comparative concentrations are calculated, wavelet coefficients in a case where the two concentrations are changed are calculated to create a wavelet coefficient table, and an input image obtained by imaging a concrete surface as a crack detection target is subjected to wavelet transformation. In the step of determining the crack area, in the wavelet coefficient table, wavelet coefficients corresponding to an average concentration of neighboring pixels in a local area and a concentration of a pixel of interest are set as threshold values, and a crack area and an area with no crack are determined by comparing the wavelet coefficient of the pixel of interest with the threshold values.

As a method of detecting rust and peeling, for example, a processing method for a coating inspection system of a steel bridge described in JP2010-538258A can be used. In the processing method, rust and peeling are detected using color information from a captured image file of a steel bridge coating, video processing, water shade, and Parzen window.

In the damage diagram creation system 10 according to the first embodiment, in this way, damage is detected from the captured images before composition. Therefore, since the damage detection performance is not deteriorated due to deterioration of image quality in an overlapping area of images, it is possible to detect damage based on a plurality of images acquired by subjecting a subject to split imaging with high accuracy. The detection results of damage are composed using the composition parameter between the images as described below.

<Determination of Permission and Prohibition of Composition>

The server 300 (the composition parameter calculation unit 300B) determines whether or not all captured images can be composed into one image based on the composition parameter calculated in Step S202 (Step S206). Determination of permission and prohibition of composition can be performed based on the number of correspondence points, whether or not the reliability of the correspondence point is sufficient (whether or not the correspondence points are feature points), whether or not the projective transformation matrix can be calculated based on the correspondence points, or the like. In this case, the calculation of the projective transformation matrix and an evaluation value thereof may be repeatedly determined while changing a combination of correspondence points with a random sample consensus (RANSAC) algorithm or the like. In a case where all images can be composed into one image (in Step S206, YES), the process progresses to Step S222, and composition of the detection results (the results of the detection) is performed. In a case where all images cannot be composed into one image (in Step S206, NO), as described below, processing of Steps S208 to S220 is executed, and then, the process progresses to Step S222. Steps S208 to S220 are the processing in a case where all images cannot be composed into one image (automatic composition). In the steps, in regards to composable image groups, a composition parameter is calculated for each image group to compose the detection results of damage for each image group. The correspondence points are designated between uncomposable image groups based on a user's operation as described below to calculate a composition parameter, and the detection results are composed based on the calculated composition parameter. For example, in a case of image groups G1 and G2 (see FIGS. 16 to 19) described below, the detection results are composed for the images constituting the image groups G1 and G2, and the detection results composed for the image groups G1 and G2 are composed into one detection result according to a composition parameter calculated based on a user's operation between the image groups G1 and G2 (see FIGS. 20 to 22C).

<Classification of Images>

In a case where determination is made in Step S206 that "all captured images cannot be composed into one image", the composition parameter calculation unit 300B divides the captured images into composable image groups (Step S208), and the composition parameter calculation unit 300B decides an image arrangement based on correspondence points between images by image group (calculates a composition parameter) (Step S210). In a case where the image arrangement is decided, the detection results can be composed based on the arrangement.

<Decision of Image Arrangement>

Figure 14:
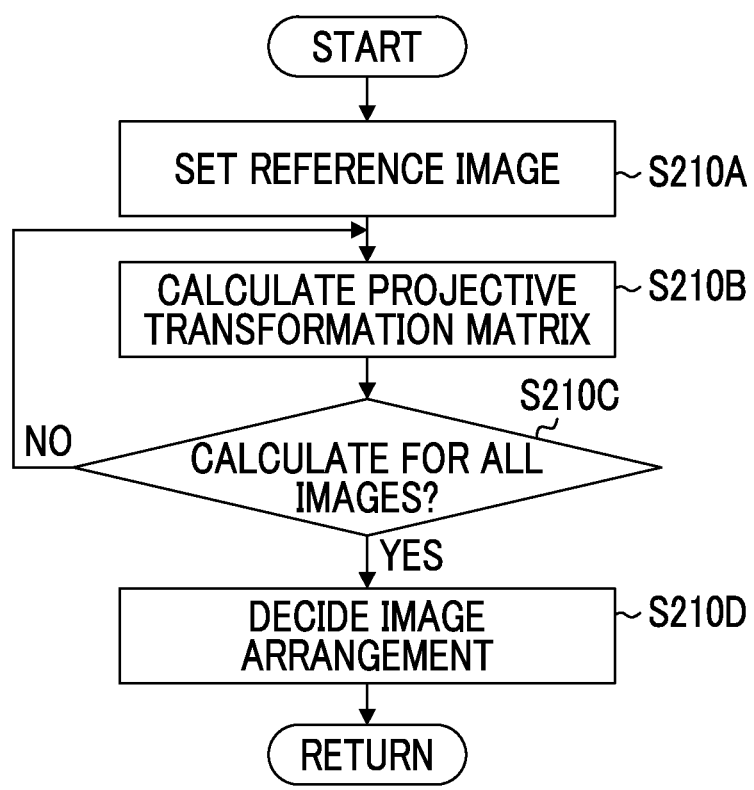
FIG. 14 is a flowchart showing image arrangement decision processing.
Figure 15A:
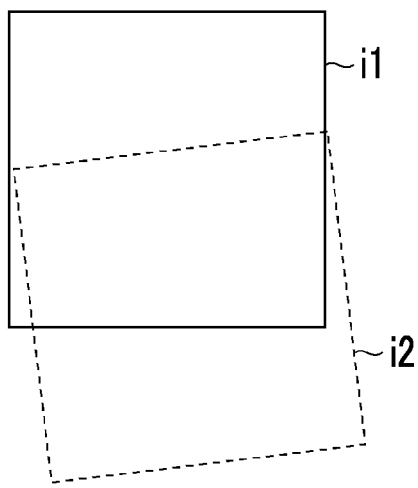
FIGS. 15A and 15B are diagrams showing an aspect of setting a reference image.

FIG. 14 is a flowchart showing details of image arrangement decision processing in Step S210 of FIG. 6. The composition parameter calculation unit 300B sets a reference image to be a reference of projective transformation from among a plurality of captured images (Step S210A). Although the reference image can be set (selected) according to a feature of an image, such as the degree of confronting or sharpness, an image in a specific imaging order (for example, an initially captured image) may be set as a reference image. In the examples of FIGS. 10 and 11, as shown in FIG. 15A, the image i1 can be set as a reference image for the images i1 and i2.

Figure 15B:
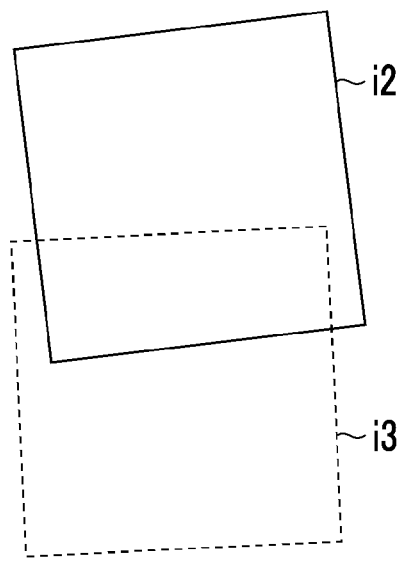

After the reference image is set, the composition parameter calculation unit 300B calculates a projective transformation matrix of an image other than the reference image with respect to the reference image based on the correspondence points between the images (Step S210B). In the examples of FIGS. 10 and 11, as shown in FIG. 15A, the image i2 (an image other than the reference image) is projected on the same plane as the image i1 (the reference image), and the projective transformation matrix for making the correspondence points coincide with each other is calculated. After the projective transformation matrix of the image i2 with respect to the image i1 (the reference image) is calculated, as shown in FIG. 15B, the image i2 is set as the reference image, and the projective transformation matrix of the image i3 with respect to the image i2 is calculated. In this way, the projective transformation matrix is calculated for all images of the image group while changing the reference image (until the determination in Step S210C is YES).

After the projective transformation matrix is calculated for all images, the composition parameter calculation unit 300B moves, rotates, magnifies, reduce, modifies, or the like each image based on the calculated projective transformation matrix and decides an arrangement of each image of the image group (Step S210D). Hereinafter, description will be provided assuming that the images i1 to i4 and the images i6 to i9 constitute a composable image group G1, and the image i5 and the image i10 constitute a composable image group G2. In the decision of the above-described image arrangement, although each image is moved, rotated, modified, or the like based on the projective transformation matrix, the example shown in the drawing conceptually shows the image arrangement or the like, but does not accurately represent the movement, rotation, modification, or the like of the image.

Figure 17:
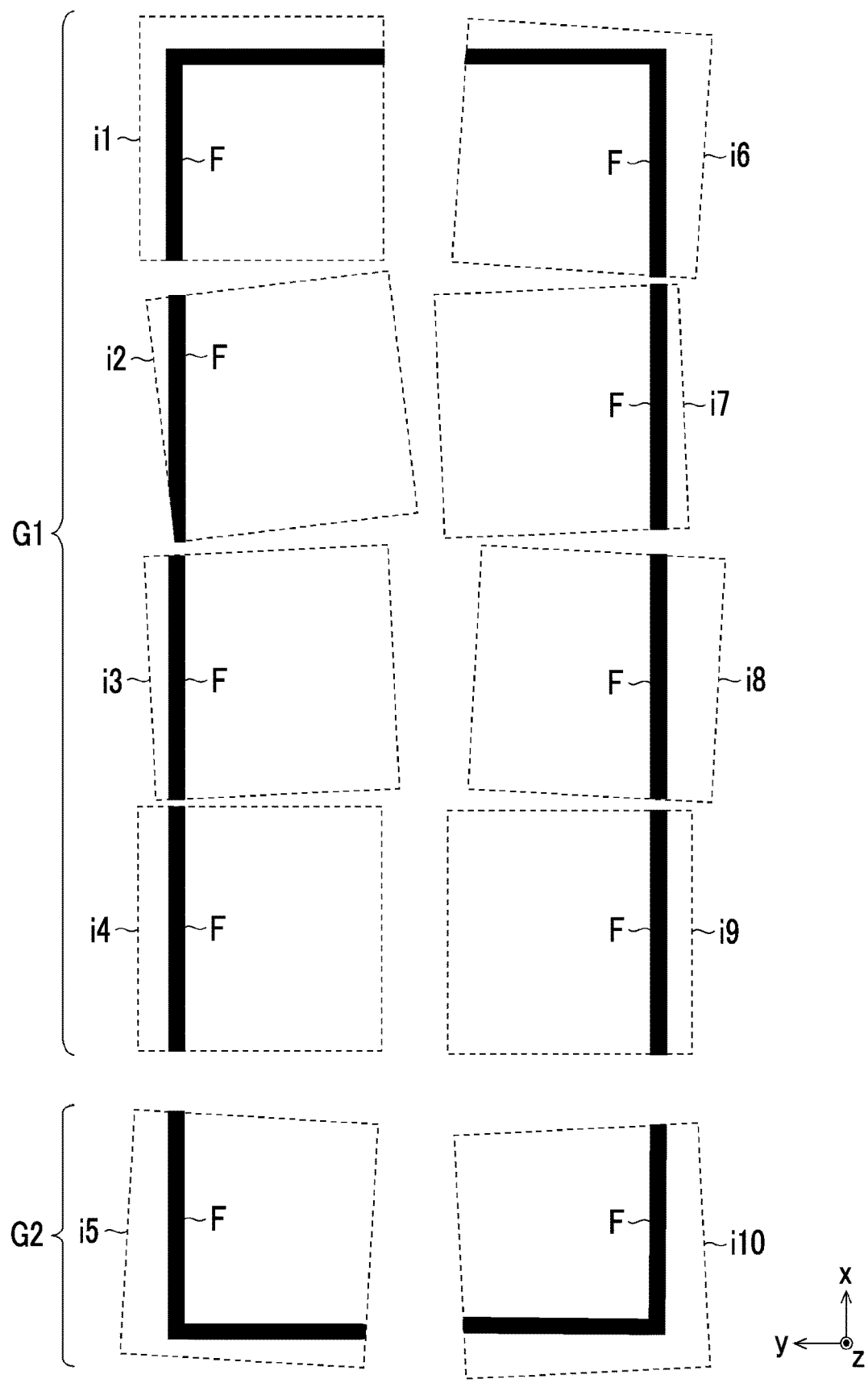
FIG. 17 is another diagram showing an example of image arrangement by image group.

The image arrangement decided in Step S210D may be an image arrangement (see FIG. 16) in which overlapping areas between the images overlap each other or may be an image arrangement (see FIG. 17) in which the images do not overlap each other. In a case of the image arrangement in which the images do not overlap each other, as shown in FIG. 17, an arrangement in which the images are arranged at intervals in the x direction and the y direction, and a direction of each image is not changed to a direction obtained based on the projective transformation matrix (each image is not rotated) can be made.

<Image Display>

In a case where the image arrangement is decided in Step S210 (Steps S210A to S210D), the server 300 (the display controller 300I and the communication controller 300J) instructs the client 200 to display the composable image groups (Step S212). The instruction to the client 200 includes the images to be displayed, information regarding the arrangement of the images, and information obtained by vectorizing the detection results of damage in Step S204. The client 200 (the display controller 210C) superimposes information obtained by vectorizing the detection results of damage on the images according to the instruction for the display, and displays the images on the monitor 232 for each composable image group (Step S106). In the above-described example, the display controller 210C displays the image groups G1 and G2 in the image arrangement shown in FIG. 16 or 17. An aspect in which cracks in the images i4, i5, i9, and i10 in the image arrangement of FIG. 16 are vectorized and displayed in a superimposed manner is shown in FIG. 18. In the display, the display controller 300I and/or the display controller 210C executes processing for surrounding each of the image groups G1 and G2 by a frame, displaying the image groups in different colors, displaying the number of each image group, or the like such that the image groups can be easily identified.

Figure 19:
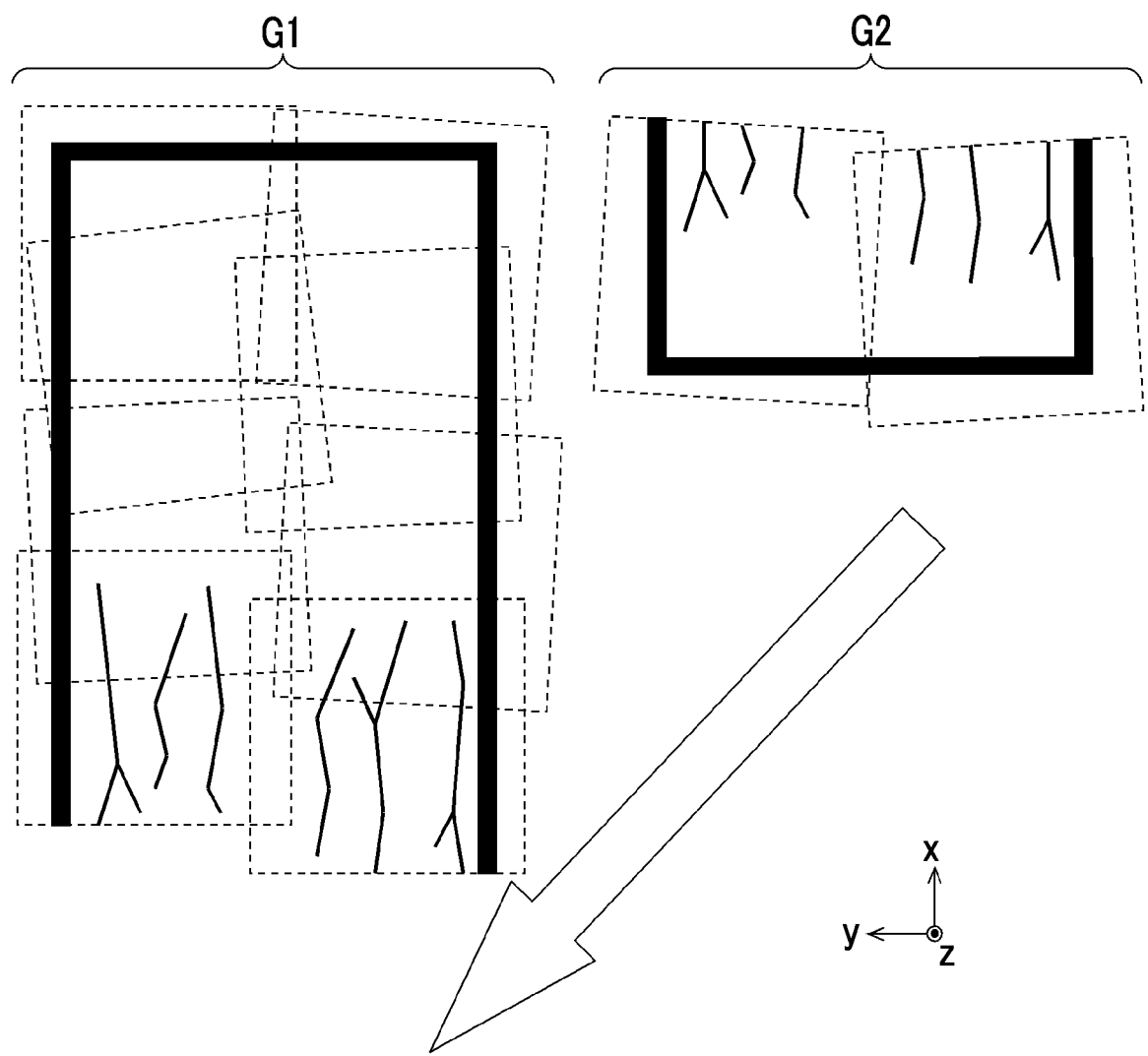
FIG. 19 is a diagram showing an aspect of change of a relative arrangement by image group.

In the display in Step S106, the arrangement between the image groups may be inappropriate. For example, as shown in FIG. 19, the image group G2 that should be arranged below the image group G1 (−x direction) may be arranged in a lateral direction of the image group G1. Accordingly, the server 300 (the composition parameter calculation unit 300B) determines whether or not to change the arrangement of the image groups (Step S214), in a case where determination is made to change the arrangement (in Step S214, YES), the process returns to Step S212, and makes the client 200 display the image groups G1 and G2 in an arrangement after change again. The determination in Step S214 can be performed based on a user's instruction input (for example, an operation to move the image group G2, that is, to change a relative arrangement of the image group G2 through the keyboard 242 and/or the mouse 244). In the example of FIG. 19, the composition parameter calculation unit 300B and the display controller 300I can move the image group G2 below the image group G1 (move in a direction indicated by an arrow) based on a user's operation (for example, a drag operation with the mouse 244) and can display the image groups G1 and G2 as in FIG. 16.

Although a lot of time may be needed for the designation of the correspondence points in a case where the display is performed in a state in which the relative arrangement between the image groups is inappropriate, in the damage diagram creation system 10, it is possible to enable rapid and easy designation of the correspondence points by changing such an arrangement.

<Designation of Correspondence Points>

Figure 20:
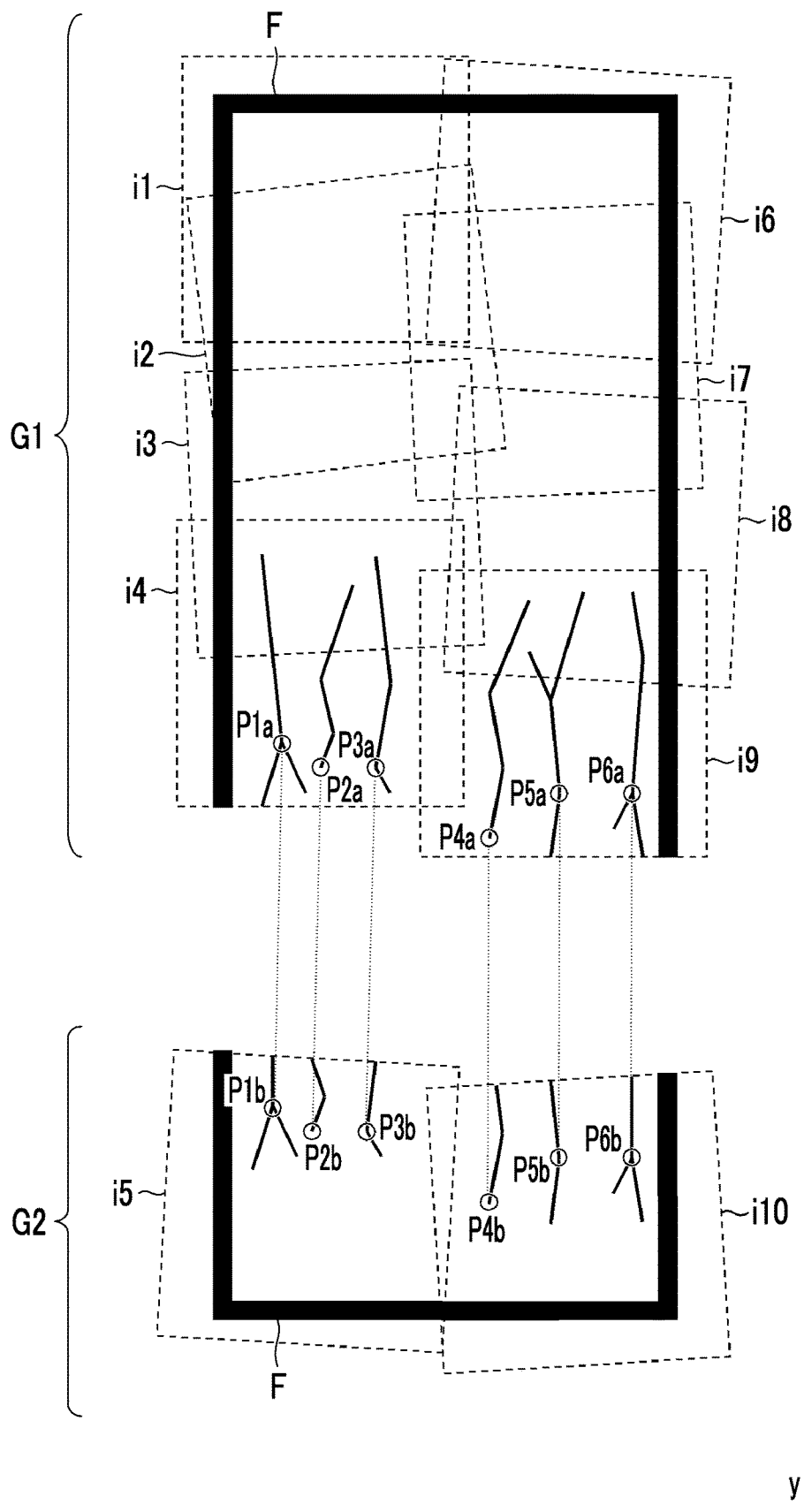
FIG. 20 is a diagram showing an aspect in which correspondence points are set in image groups.

In a case where the arrangement of the image groups is decided through the processing to Step S214, the server 300 (the correspondence point designation unit 300F) designates correspondence points for one image group and another image group among the displayed image groups (Step S216). For example, in a case where the image groups G1 and G2 are arranged and displayed as in FIG. 16, as shown in FIG. 20, a point P1a is designated according to a click or the like (the correspondence point designation operation in Step S108) of the mouse 244 in the image group G1, and a point P1b as a correspondence point of the point P1a is designated in the image group G2. As the correspondence points, for example, feature points, such as start points, end points, or junctions of cracks determined to be identical, and/or end portions, side portions, joints of members, can be designated. In this case, the correspondence point designation unit 300F and the display controller 300I identify the correspondence relationship by connecting the designated points P1a and P1b by a straight line or the like (FIG. 20), whereby it is possible to allow easy ascertainment of the correspondence of the designated points. Hereinafter, similarly, a point P2a and a point P2b, a point P3a and a point P3b, a point P4a and a point P4b, a point P5a and a point P5b, and a point P6a and a point P6b are designated.

Although FIG. 20 shows an example where the six correspondence points are designated for each of the image groups G1 and G2 has been described, the number of correspondence points to be designated is not particularly limited. Even though the image groups G1 and G2 are arranged and displayed as in FIG. 17, similarly, the correspondence points can be designated between the images i4 and i5 and between the images i9 and i10.

In this way, in the damage diagram creation system 10 according to the first embodiment, since the composable image groups (the image groups G1 and G2) are displayed by image group, it is possible to allow easy ascertainment of an image group that can be composed or cannot be composed (automatically). Since it the correspondence points may be designated for the image groups (the image group G1 and the image group G2) that cannot be composed, there is no need to designate the correspondence points for all images, and it is possible to enable rapid and easy designation of the correspondence points and calculation of the composition parameter based on the designated correspondence points.

In a case where the composition parameter cannot be calculated with high accuracy with the correspondence points designated as described above, the server 300 (the composition parameter calculation unit 300B, a warning message may be displayed on the monitor 232 by the correspondence point designation unit 300F, the display controller 300I, and the like) and the client 200 (the display controller 210C and the like) to prompt the user to perform a correspondence point designation operation again.

<Image Arrangement Decision Based on Designated Correspondence Points>

After the correspondence points are designated in Step S216, the server 300 (the composition parameter calculation unit 300B) calculates the composition parameter based on the designated correspondence points for each composable image group (Step S218). In the example of FIG. 20, the composition parameter calculation unit 300B calculates a projective transformation matrix of the image group G2 with the image group G1 as a reference (a projective transformation matrix of the image group G1 with the image group G2 as a reference) based on the points P1a to P6b as the correspondence points. The image composition unit 300C and the composition parameter calculation unit 300B move, rotate, modify, or the like the images (the images i5 and i10) constituting the image group G2 with the projective transformation matrix calculated in this way to decide an image arrangement (Step S220). The decision of the image arrangement in Step S220 can be performed in the same procedure as Step S210.

<Composition of Detection Results>

Figure 21A:
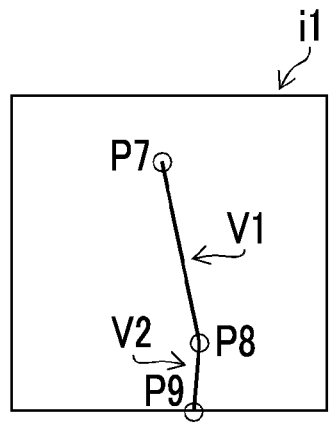
FIGS. 21A to 21C are diagrams showing composition of detection results.
Figure 21B:
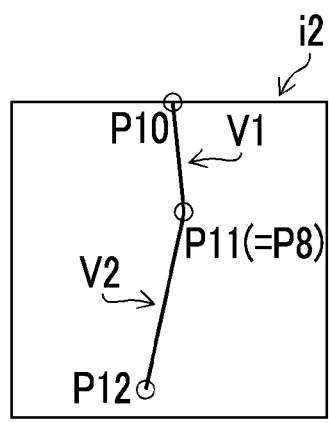
Figure 21C:
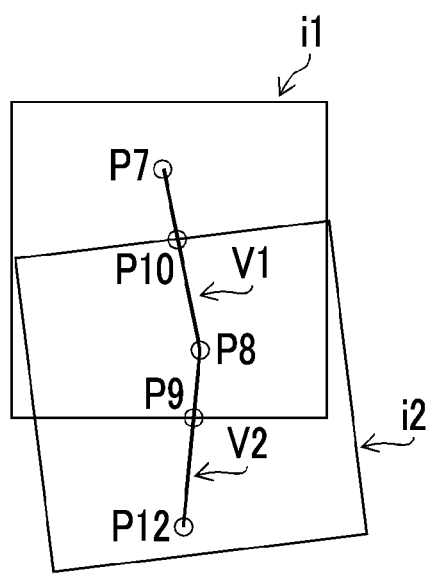

The server 300 (the detection result composition unit 300E) composes the detection results (the results of the detection) based on the composition parameter (projective transformation matrix) calculated in Step S202 or S220 (Step S222). For example, as shown in FIGS. 21A and 21B, it is assumed that different portions (partially overlap) of damage vectors V1 and V2 in the images i1 and i2 are detected, and start points and end points of the damage vectors V1 and V2 are points P7 to P12. FIGS. 22A and 22B are tables indicating the start points and the end points of the damage vectors V1 and V2 corresponding to FIGS. 21A and 21B. In this case, in the detection result after composition, as shown in FIG. 21C (in a case where the image i2 is moved, rotated, or the like with the projective transformation matrix and composed), the start point and the end point of the damage vector V1 become the points P7 and P8, respectively, and the start point and the end point of the damage vector V2 become the points P8 and P12, respectively. FIG. 22C corresponds to FIG. 21C, and shows the start points and the end points of the damage vectors V1 and V2 after composition.

<Composition of Detection Results in Overlapping Area of Images>

Figure 23A:
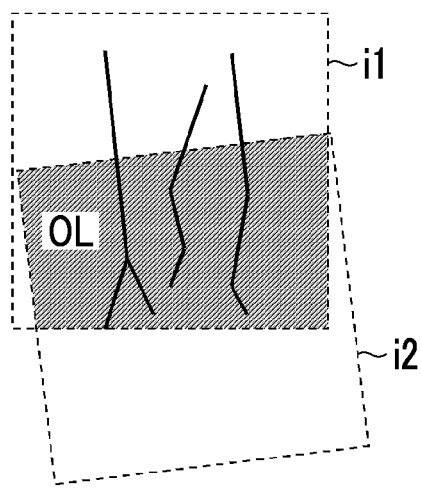
FIGS. 23A and 23B are diagrams showing composition of detection results in an area where images overlap each other.
Figure 23B:
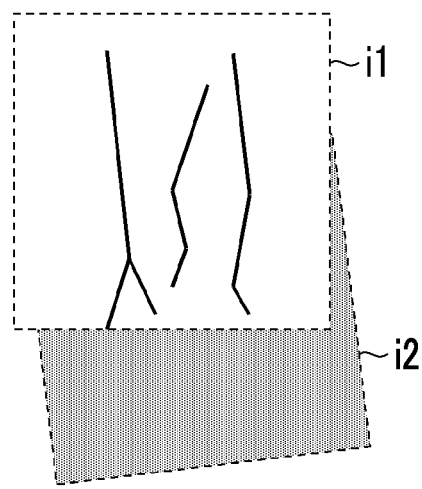

As described above, in a case where the images are acquired such that the imaging ranges partially overlap one another, in an area where a plurality of images overlap one another, there are a plurality of detection results that should be intrinsically composed into one detection result due to misregistration of the images, or the like. That is, composition accuracy may be deteriorated. Accordingly, in the damage diagram creation system 10, in the area where a plurality of images overlap one another, one of a plurality of overlapping images is selected to compose the detection results, whereby it is possible to compose the detection results with high accuracy. An aspect of such composition is shown in FIGS. 23A and 23B. In the example of FIGS. 23A and 23B, the image i1 is selected in an area OL where the images i1 and i2 overlap each other, and composition is performed using the detection result for the image i1.

The composition of the detection results described above is performed for the images stored in the same folder (a plurality of images divided into a group). In the example shown in FIG. 13, the detection results for the ten images stored in the subfolder SS1 are composed (the detection results are composed by group).

<Composition of Images>

Figure 24:
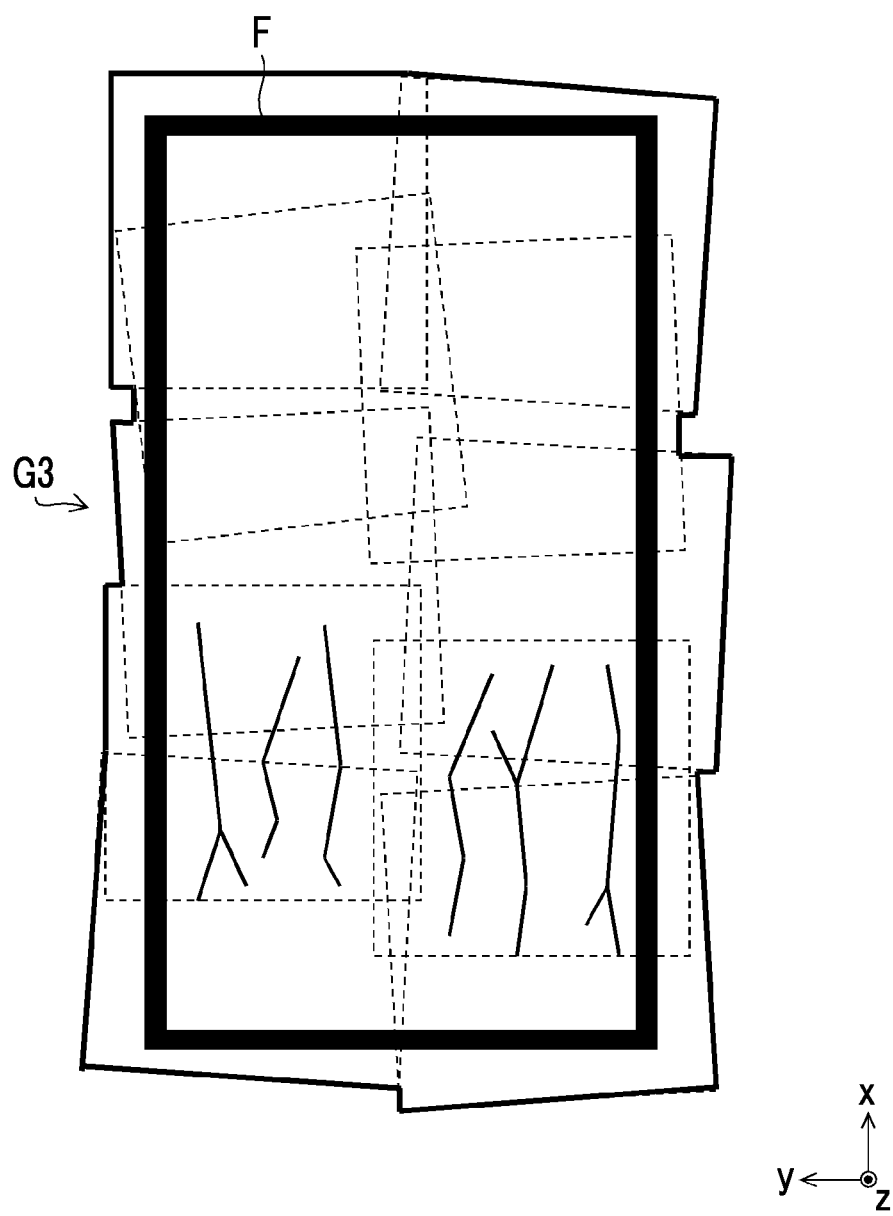
FIG. 24 is a diagram showing a composed image.
Figure 25:
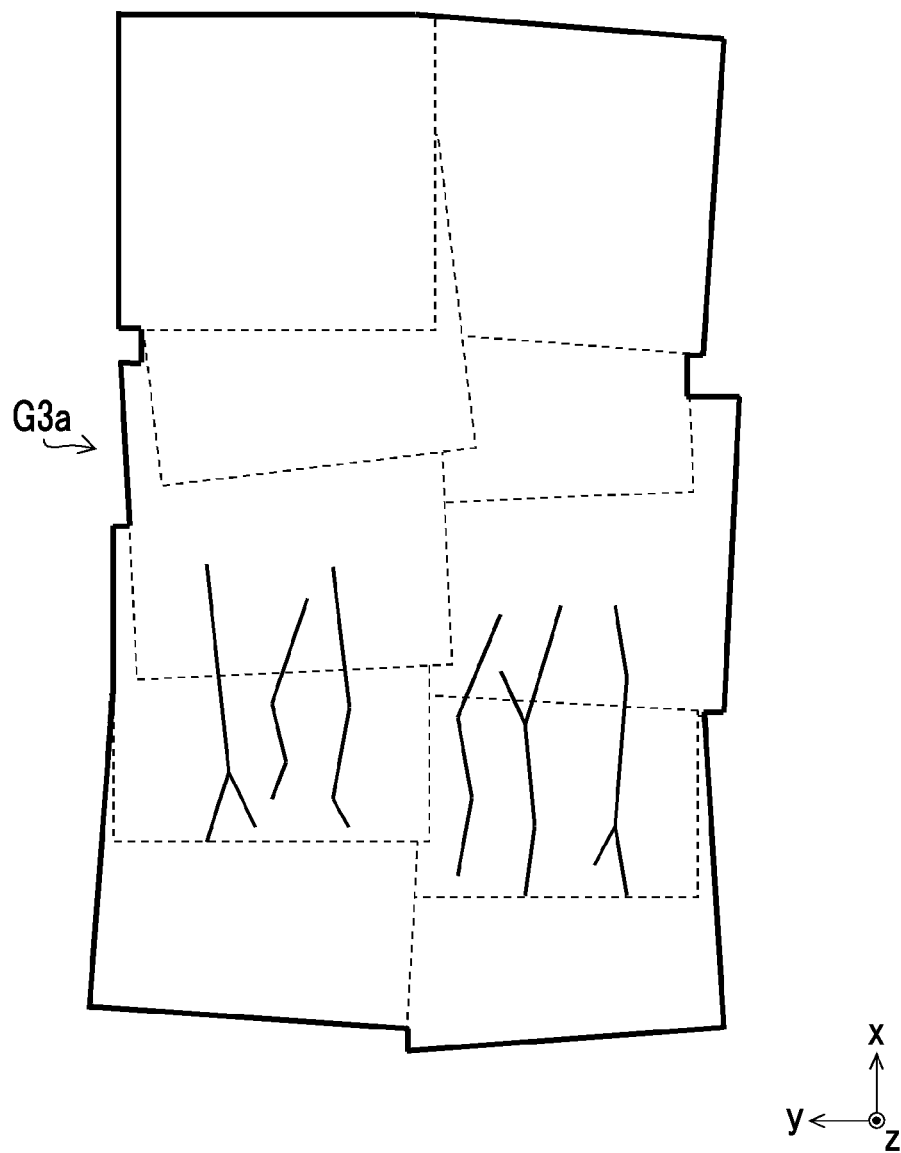
FIG. 25 is another diagram showing a composed image.

The server 300 (the image composition unit 300C) composes the images based on the composition parameter (projective transformation matrix) calculated in Step S202 or S218 (Step S224). FIG. 24 shows a composed image G3. FIG. 25 shows an image G3a composed by selecting one image in an area where images overlap each other as in FIGS. 23A and 23B. Since a damage diagram can be created in a case where the detection results are composed, the composition of the images may be omitted.

<Confronting Correction after Composition>

In the damage diagram creation system 10, although the projective transformation matrix of another image with respect to the reference image is calculated to decide the image arrangement as described above, in a case where the reference image is not in a confronting state in an imaging direction, an area that should be intrinsically in a rectangular shape in an image after composition may not be in a rectangular shape. For example, the frame F of the panel in the image after composition may be in a trapezoidal shape. In this case, the server 300 (the composition parameter calculation unit 300B, the image composition unit 300C, and the like) designates points (for example, points of four corners of the frame F) forming a rectangular shape based on a user's operation through the keyboard 242 and/or the mouse 244 and forms a rectangular shape with the four points through projective transformation. With this, it is possible to obtain an image (confronting image), in which the subject is in a confronting state, even after image composition.

<Mapping of Measurement Result>

The server 300 (the damage mapping unit 300G) may map the detection result of damage to the composite image. Mapping can be performed, for example, by displaying a character, a figure, a symbol, or the like associated with the detection result on the composite image. The character, figure, symbol, or the like to be displayed can be selected by an operation through the operating unit 240 (the keyboard 242 and/or the mouse 244), and the server 300 (the damage mapping unit 300G, the display controller 300I, and the like) and the client 200 (the display controller 210C) makes the monitor 232 display the mapped image according to the selection. The character, the figure, the symbol, or the like may simplify or enhance actual damage or may be displayed in different aspects according to the classification, size, or the like of damage. The image to which the measurement result is mapped is stored in the storage unit 220 (the damage mapped image 220D of FIG. 4), and is displayed on the monitor 232 under the control of the display controller 210C. Damage information may be input to the damage mapped image.

Such mapping of the measurement result may be performed on diagram data (for example, computer-aided design (CAD) data) including diagram information indicating the shape of the bridge 1. In this case, in a case where a coordinate system defining CAD data is different from a coordinate system shown in FIG. 24, 25, or the like, coordinate transformation (movement, rotation, mirroring, or the like) according to the relationship of the coordinate systems. Such transformation can be performed by the server 300 (the damage mapping unit 300G).

<Result Display>

The server 300 (the detection result output unit 300H, the display controller 300I, the communication controller 300J, and the like) instruct the client 200 to display the detection results (Step S226), and the client 200 (the display controller 210C and the like) makes the monitor 232 display the detection results according to the instruction (Step S110). The detection results can be displayed by characters, numerals, symbols, or the like, the detection result for each captured image may be displayed or the composed detection result may be displayed (see FIGS. 21A to 21C and 22A to 22C). The captured images, the composite image, the damage mapped image, or the like may be displayed in conjunction with the detection results or instead of the detection results. Information (see FIGS. 21A to 21C and 22A to 22C) obtained by vectorizing the detection results may be displayed on the images in a superimposed manner. The display controller 210C can select a content to be displayed on the monitor 232 and an aspect thereof according to an operation on the operating unit 240. The display controller 210C measures a time after the results are displayed and determines the presence or absence of an output instruction after the display of the results. In a case where a display time is long with no output instruction, and transition is made to another screen with no output instruction, or the like, there is a possibility that a fraud, such as visual copy, is performed. With the measurement of the display time and the determination of the presence or absence of the output instruction, such a fraud can be detected. In a case where a fraud is detected, for example, a measure as stopping the display or the like can be taken.

<Result Output>

Figure 26:
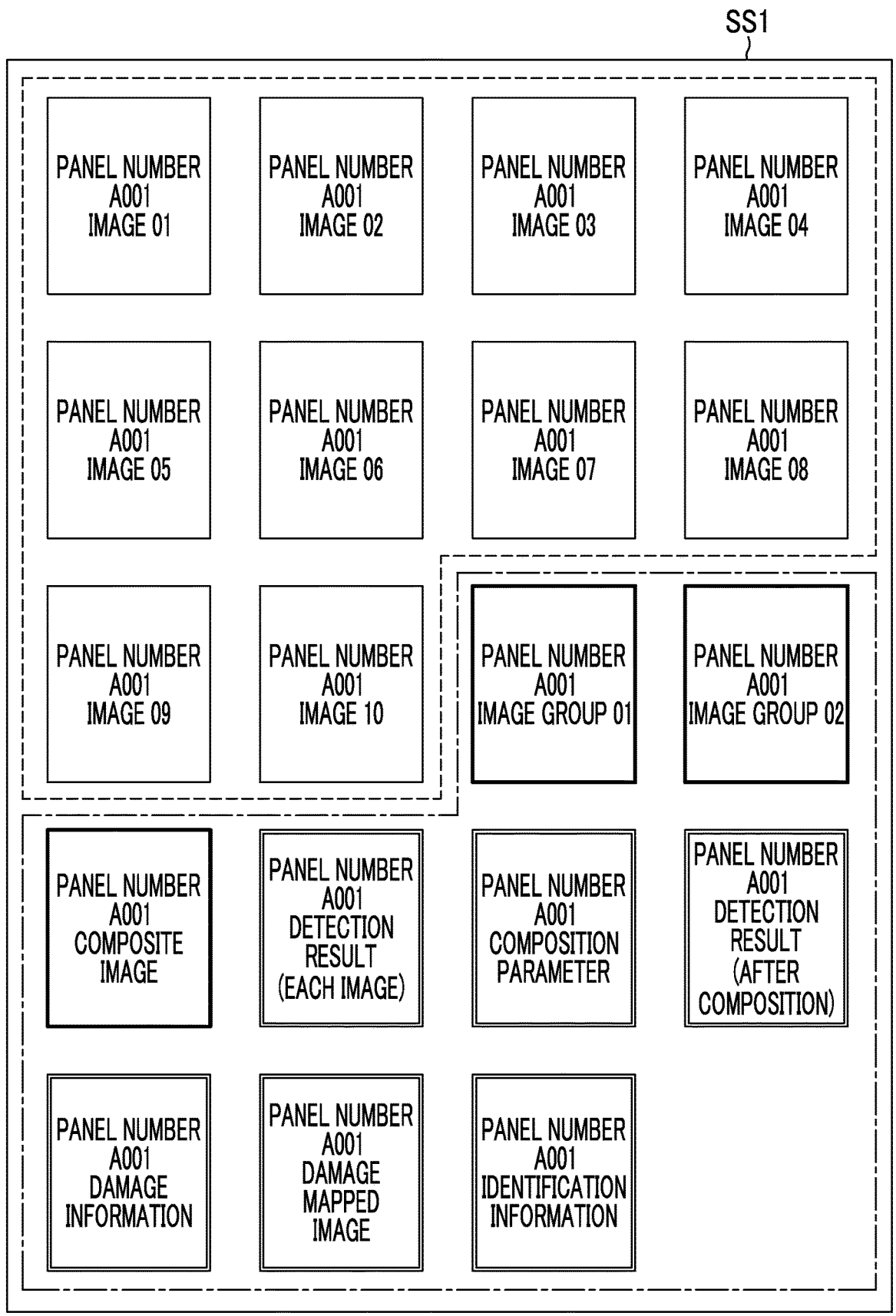
FIG. 26 is a diagram showing an aspect in which detection results and the like are stored in the same folder as images.

The server 300 (the detection result output unit 300H and the like) determines whether or not there is an instruction operation (for example, an output instruction operation through the operating unit 240) to output the detection results displayed in Step S110 (Step S228). Only in a case where there is the output instruction operation (in Step S228, YES), the process progresses to Step S230 and instructs the client 200 to output the detection results (the detection result for each image and the composed detection result), and the client 200 (the file management unit 210B) outputs the detection result according to the output instruction (Step S112). In the example of FIG. 13, the detection results for the images stored in the subfolder SS1 are stored in the same subfolder SS1 as the folder where the images are stored (the detection results are output in association with the groups; see FIG. 26). The detection results may be output in the same format as diagram data (for example, CAD data) including diagram information indicating the shape of the bridge 1 (subject). The detection results may be printed by a printer (not shown).

In this way, in the first embodiment, since the detection results are stored in the same folder as the folder where the images are stored, the correspondence between the input images and the composed detection result becomes clear, and it is possible to easily manage and use the images and the detection results. The output of the detection results is performed only in a case where there is the output operation instruction (in a case where the determination in Step S228 is YES). In a case where there is no output operation instruction, the identification information is attached to the images (Step S232), and the attached identification information is notified to the client 200 and is stored in the same folder (in the examples of FIGS. 13 and 26, the subfolder SS1) as the folder where the images are stored.

After the detection results or the identification information is output, the server 300 determines whether or not the processing for all folders ends (Step S234). After the determination is affirmative, the server 300 notifies the client 200 of the end in Step S236 (Step S236), and ends the processing. In a case where the processing for all folders does not end, the process returns to Step S202 and Steps S202 to S234 are repeated for other folders.

As described above, with the damage diagram creation system 10 according to the first embodiment, it is possible to detect damage based on a plurality of images acquired by subjecting a subject to split imaging with high accuracy.

Second Embodiment

Figure 27:
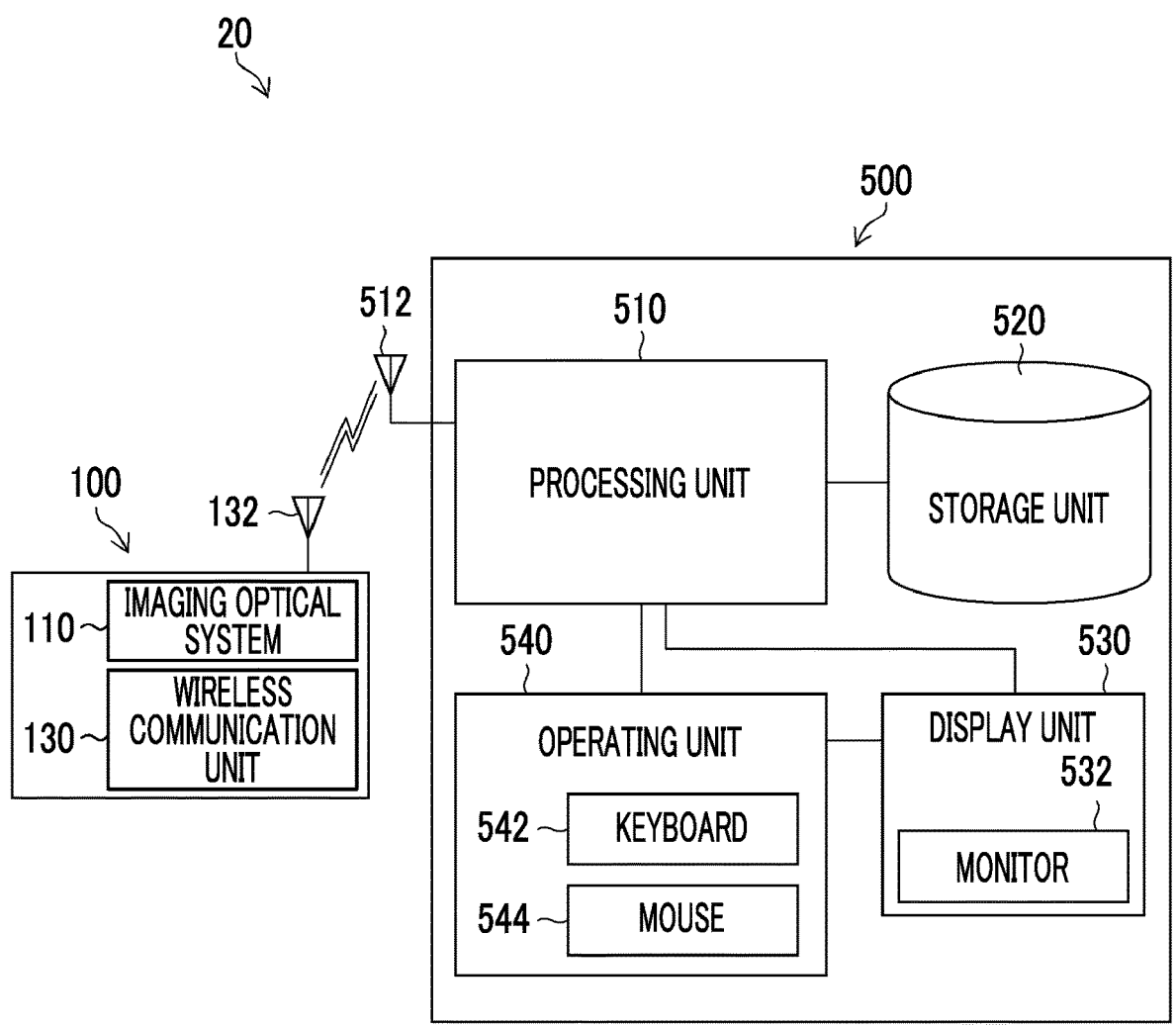
FIG. 27 is a block diagram showing the configuration of a damage diagram creation device according to a second embodiment.

In the above-described first embodiment, the damage diagram creation system 10 comprising the server 300 and the client 200 has been described, in a second embodiment, a damage diagram creation device 20 will be described. FIG. 27 is a diagram showing the configuration of the damage diagram creation device 20. The damage diagram creation device 20 is constituted of the digital camera 100 and a device body 500. Since the configuration of the digital camera 100 is the same as the configuration of the digital camera 100 in the first embodiment, the configuration of the digital camera 100 is represented by the same reference numerals, and detailed description will not be repeated. The digital camera 100 may be integrated with the device body 500.

<Configuration of Damage Diagram Creation Device>

Although the damage diagram creation system 10 according to the first embodiment comprises the server 300 and the client 200, and a principal portion of the processing, such as detection of damage and composition, is performed in the server 300, in the damage diagram creation device 20 according to the second embodiment, a processing unit 510 of the device body 500 performs the processing. Specifically, the processing unit 510 has the functions of the client 200 shown in FIG. 3 and the functions of the server 300 shown in FIG. 5. In a storage unit 520, the same information (see FIG. 4) as information stored in the storage unit 220 according to the first embodiment is stored. The configuration and functions of an operating unit 540 (a keyboard 542 and a mouse 544) are the same as those of the operating unit 240 (the keyboard 242 and the mouse 244) according to the first embodiment. The configuration and functions of a display unit 530 (a monitor 532) are the same as those of the display unit 230 (the monitor 232) according to the first embodiment. In the damage diagram creation device 20, equipment (information terminal), such as a personal computer, a tablet terminal, or a smartphone, which receives the images as input and performs the processing, such as detection of damage and composition, can be used as the device body 500.

<Processing of Damage Diagram Creation Method>

Processing (processing of the damage diagram creation method according to the embodiment of the invention) in the damage diagram creation device 20 is the same as in the flowcharts of FIGS. 6, 7, and 14. For example, a plurality of images acquired by subjecting a subject to split imaging are input, a composition parameter (projective transformation matrix) for composing a plurality of images is calculated based on correspondence points between images, damage of the subject is detected from each image constituting a plurality of images, and detection results for a plurality of images are composed based on the composition parameter. Such processing is executed by the processing unit 510 of the device body 500. In the first embodiment, although communication of the client 200 and the server 300 is performed, in the damage diagram creation device 20, communication inside the device body 500 is performed.

In the damage diagram creation device 20 according to the second embodiment, damage is detected from the captured images before composition as in the damage diagram creation system 10 according to the first embodiment. Therefore, since the damage detection performance is not deteriorated due to deterioration of image quality in an overlapping area of images, it is possible to detect damage based on a plurality of images acquired by subjecting a subject to split imaging with high accuracy.

Although the embodiment of the invention has been described above, the invention is not limited to the above-described embodiment, and may have various modifications without departing from the spirit of the invention.

EXPLANATION OF REFERENCES

1: bridge
1A: inspection area
1B: inspection area
2: main girder
3: cross beam
4: cross frame
5: lateral frame
6: deck slab
10: damage diagram creation system
20: damage diagram creation device
100: digital camera
110: imaging optical system
130: wireless communication unit
132: antenna
200: client
210: processing unit
210A: image input unit
210B: file management unit
210C: display controller
210D: communication controller
210E: ROM
212: antenna
220: storage unit
220A: captured image
220B: detection result
220C: composite image
220D: damage mapped image
230: display unit
232: monitor
240: operating unit
242: keyboard
244: mouse
300: server
300A: image acquisition unit
300B: composition parameter calculation unit
300C: image composition unit
300D: damage detection unit
300E: detection result composition unit
300F: correspondence point designation unit
300G: damage mapping unit
300H: detection result output unit
300I: display controller
300J: communication controller
300K: ROM
500: device body
510: processing unit
520: storage unit
530: display unit
532: monitor
540: operating unit
542: keyboard
544: mouse
A: area
A1: area
Ai: area
Aj: area
An: area
F: frame
G1: image group
G2: image group
G3: image
G3a: image
G0: panel
MF: main folder
NW: network
OL: area
P1a: point
P1b: point
P2a: point
P2b: point
P3a: point
P3b: point
P4a: point
P4b: point
P5a: point
P5b: point
P6a: point
P6b: point
S100 to S236: steps of damage diagram creation method
SF1: subfolder
SF2: subfolder
SS1: subfolder
SS2: subfolder
SS3: subfolder
SS4: subfolder
SS5: subfolder
V1: damage vector
V2: damage vector
i1: image
i2: image
i3: image
i4: image
i5: image
i6: image
i7: image
i8: image
i9: image
i10: image

What is claimed is:

1. A damage diagram creation device comprising a non-transitory and tangible computer readable recording medium and a processor, wherein the processor is configured to, by referring to the recording medium:
obtain a composition parameter for a plurality of images acquired by split-imaging a subject, the composition parameter being calculated based on correspondence points between images;
obtain damage vector information of the subject acquired for each image constituting the plurality of images, the damage vector information constituted of line segments indicating a start point and an end point of damage and/or a figure constituted of the line segments; and
compose the damage vector information based on the composition parameter,
wherein the processor is further configured to:
in a case where the composition parameter for composing the plurality of images into one image is unable to be calculated,
calculate the composition parameter by composable image group among the plurality of images; and
compose results of a detection by the image group based on the composition parameter calculated by the image group, and wherein the processor is further configured to:
  display a result of the composing by the composable image group; and
  accept designation of the correspondence points by a user.

2. The damage diagram creation device of claim 1, wherein the processor is further configured to:
  store the obtained damage vector information in the recording medium; and
  update the stored obtained damage vector information with the composed damage vector information.

3. The damage diagram creation device of claim 1, wherein the processor is further configured to:
  display the plurality of images in a superimposed manner based on the composed damage vector information.

4. The damage diagram creation device of claim 3, wherein the processor is further configured to:
  display the plurality of images and the damage vector information in a superimposed manner.

5. The damage diagram creation device of claim 1, wherein the processor is further configured to:
  obtain information indicating the line segments or a set of the line segments as the damage vector information for linear damage; and
  obtain information indicating a figure constituted of the line segments as the damage vector information for damage having a spread.

6. The damage diagram creation device of claim 1, wherein the processor is further configured to:
  detect damage of the subject for each image constituting the plurality of images, by executing image analysis.

7. The damage diagram creation device of claim 1, wherein the processor is further configured to:
  calculate information regarding a projective transformation matrix of an image other than a reference image among the plurality of images with respect to the reference image as the composition parameter.

8. The damage diagram creation device of claim 1, wherein the processor is further configured to:
  in an area where a plurality of images overlap one another, select one of the plurality of overlapping images and compose the results of the detection.

9. A damage diagram creation method executed by a damage diagram creation device comprising a non-transitory and tangible computer readable recording medium, and a processor, wherein the processor executes, by referring to the recording medium:
  obtaining a composition parameter for a plurality of images acquired by split-imaging a subject, the composition parameter being calculated based on correspondence points between images;
  obtaining damage vector information of the subject acquired for each image constituting the plurality of images, the damage vector information constituted by line segments indicating a start point and an end point of damage and/or a figure constituted of the line segments; and
  composing the damage vector information based on the composition parameter, wherein the method further comprises:
  in a case where the composition parameter for composing the plurality of images into one image is unable to be calculated,
  calculating the composition parameter by composable image group among the plurality of images; and
  composing results of a detection by the image group based on the composition parameter calculated by the image group, and
wherein the method further comprises:
  displaying a result of the composing by the composable image group; and
  accepting designation of the correspondence points by a user.

10. The damage diagram creation device of claim 1, wherein the processor is further configured to accept designation of the correspondence points between the image group and another image group that cannot be composed with the image group.

11. The damage diagram creation device of claim 1, wherein, in displaying the image group and another image group, the processor is further configured to execute processing for at least one of: surrounding each image group by a frame, displaying the image groups in different colors, displaying the number of each image group.

12. The damage diagram creation device of claim 1, wherein the processor is further configured to:
  determine whether or not to change an arrangement of the image group and another image group based on the user's instruction input, and
  in a case where determination is made to change the arrangement, display the image groups after the change in accordance with user's instruction input.

13. The damage diagram creation device of claim 1, wherein, in displaying the image group and another image group, the processor is further configured to identify a correspondence relationship of the designated correspondence points between the image group and the another image group.

14. The damage diagram creation device of claim 1, wherein the processor is further configured to map the detection result of damage to the composite image by displaying at least one of a character, a figure, and a symbol associated with the detection result on the composite image.

15. The damage diagram creation device of claim 14, wherein the processor is further configured to display the at least one of the character, the figure, and the symbol by simplifying or enhancing actual damage.

16. The damage diagram creation device of claim 14, wherein the processor is further configured to display the at least one of the character, the figure, and the symbol according to classification and/or size of damage.

17. The damage diagram creation device of claim 1, wherein the processor is further configured to:
  measure a time after the results are displayed;
  determine the presence or absence of an output instruction after the display of the results to detect a fraud; and
  in a case where the fraud is detected, stop the display.

* * * * *